(12) United States Patent
Chizhik et al.

(10) Patent No.: US 6,999,724 B2
(45) Date of Patent: Feb. 14, 2006

(54) SLOWING THE OBSERVED RATE OF CHANNEL FLUCTUATIONS IN A MULTIPLE ANTENNA SYSTEM

(75) Inventors: Dmitry Chizhik, Highland Park, NJ (US); Hao Xu, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 500 days.

(21) Appl. No.: 10/176,453

(22) Filed: Jun. 20, 2002

(65) Prior Publication Data

US 2004/0203395 A1 Oct. 14, 2004

(51) Int. Cl.
    *H04B 1/10* (2006.01)
(52) U.S. Cl. .................. 455/63.1; 455/65; 455/101; 455/103; 455/276.1; 455/504; 342/370
(58) Field of Classification Search ............... 455/63.1, 455/63.4, 65, 504, 506, 103, 272, 278.1, 455/101, 276.1; 342/370, 372, 373, 367, 342/359
See application file for complete search history.

(56) References Cited

U.S. PATENT DOCUMENTS 3,757,335 A * 9/1973 Gruenberg .................. 342/367

2003/0053412 A1 * 3/2003 Yoshida et al. ............. 370/208

OTHER PUBLICATIONS

T. L. Marzetta, "BLAST Training: Estimating Channel Characteristics for High Capacity Space-Time Wireless", Proceedings 37th Annual Allerton Conference on Communication, Control, and Computing, Monticello, IL, 9 pages, Sep. 22-24, 1999.

H. Xu, et als., "Spatial and Temporal Variations of MIMO Channels and Impacts on Capacity", IEEE International Conference on Communications, 2002. ICC 2002., vol. 1, pp. 262-266.

* cited by examiner

Primary Examiner—Lee Nguyen

(57) ABSTRACT

A method and apparatus for reducing the observed rate of change of the channel characteristics in a system with multiple antennas at a mobile terminal. The slowing down of the observed channel fluctuations is effectuated on the downlink by either calculating or receiving signals that have a similar Doppler shift, referred to herein as Doppler-compensatable signals, and processing one or more of the Doppler-compensatable signals to compensate for Doppler shift. The slowing down of the observed channel fluctuations is effectuated on the uplink by pre-compensating symbol streams with the Doppler shift associated with the direction in which they are transmitted, so that the observed Doppler shift of these signals when they are received is reduced or even eliminated.

28 Claims, 14 Drawing Sheets

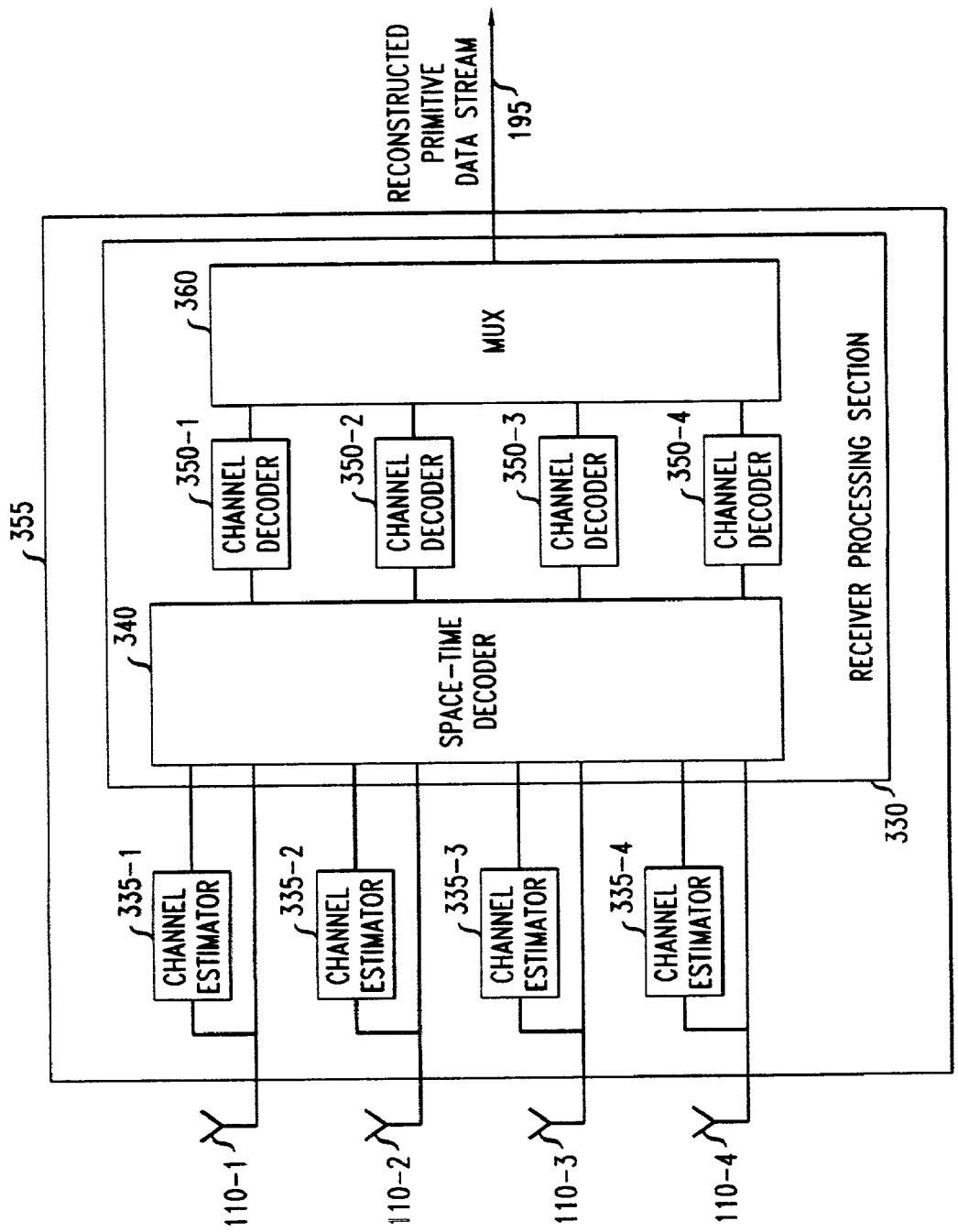

SLOWING THE OBSERVED RATE OF CHANNEL FLUCTUATIONS IN A MULTIPLE ANTENNA SYSTEM

BACKGROUND OF THE INVENTION

This invention relates to wireless communication systems, and more particularly, to wireless communication systems using multiple antennas at the receiver and/or multiple antennas at the transmitter.

Wireless communication systems in which the receiver knows the characteristics of the channel between the transmit and receive antennas have certain advantages over systems in which the receiver does not know these characteristics. The channel is the transmission path between the transmit and receive antennas. There is a channel between each transmit and receive antenna, and typically each channel has its own channel characteristics. The channel characteristics affect the transmitted signals. Thus, the received signals are the transmitted signals as modified by respective channel characteristics, plus noise.

Knowing the channel characteristics allows the receiver to recreate the transmitted signal, and, thus, makes it easier to decode the received signal. Therefore, in a system where the receiver knows the channel characteristics, a signal can typically be transmitted either at a higher data rate or at lower power level and still have acceptable error rates, as compared to a system a where the receiver does not know the channel characteristics.

The channel characteristics may be determined by transmitting known symbol sequences, which are referred to as training sequences. The essential characteristics of the training sequences are known by both the receiver and the transmitter. The receiver processes the received training sequences to produce estimates of the channel characteristics.

The channel characteristics change over time. Training sequences are transmitted regularly to obtain current channel characteristics. For example, training sequences can be transmitted at the start of each transmission burst, at regular intervals, or continuously, on either a control channel, or traffic channel, or dedicated channel. For example, in typical Code Division Multiple Access (CDMA) systems, training sequences are transmitted continuously on a pilot channel. Due to noise and interference the training sequences may not be received with the desired accuracy. The desired accuracy is one where the obtained training sequences can be used to determine the channel characteristics accurately enough to enable decoding of the information in the received signal with a desired error rate. In some systems, the problem of not receiving the training sequences with the desired accuracy is alleviated by averaging the received signal over time to obtain a more accurate estimate of the channel characteristics.

Averaging the received signal raises a problem in determining channel characteristics when the channel is changing rapidly, such as for example, when a mobile terminal is moving at high speed. When the channel characteristics change rapidly and when the averaging time needed to distinguish the training sequences accurately is long, then a signal that has been modified by channel characteristics that have long since changed is still being used in the average. Thus, the channel characteristics that are obtained at the receiver in such a case are inaccurate. Therefore, the receiver does not accurately know the channel characteristics, which requires a reduction in the data rate of the transmitted signal for it to be decoded with acceptable error rates. The problem in determining channel characteristics when the channel is changing quickly is exacerbated even further in systems that have multiple antennas at the transmitter.

It is desirable for the receiver to know the channel characteristics in systems that use multiple antennas at the transmitter, so-called multi-input systems, and/or multiple antennas at the receiver, so-called multi-output systems. Multi-input and/or multi-output wireless communication systems can achieve dramatically improved capacity compared to single antenna systems, i.e., single antenna to single antenna systems. In multi-input systems the received signal a receive antenna is typically a superposition of each of the transmitted signals as modified by the channel characteristics. Though the transmitted signals interfere with each other, these signals can be processed at the receiver to separate and decode these signals. Typically, in multi-input systems when the channel characteristics are known the transmitted signal can be transmitted at a higher data rate and still be separated out and decoded with an acceptable error rate.

The problem raised by averaging becomes more serious in multiple-input systems. Particularly, in multiple-input systems the averaging needs to be over a longer period of time and therefore it is difficult to determine the channel characteristics when the channel is changing at, or above, a moderate rate, such as, when a mobile terminal is moving at, or above, a moderate rate, such as, for example, at or above about 17 miles/hour. The averaging needs to be over a longer period of time because in multi-input systems a finite amount of transmit power is divided amongst the multiple transmit antennas, each of which is emitting a unique training sequence. This reduces the signal to noise ratio for each of the training sequences. Therefore, the averaging time needs to be increased to receive the training sequences with an acceptable error rate.

SUMMARY OF THE INVENTION

The present inventors have recognized that it is possible to reduce the observed rate of change of channel characteristics in a multi-output system by compensating for Doppler shift. This slowing down of the observed channel fluctuations can be achieved on both the downlink (i.e., the link from the base station to the mobile terminal) and on the uplink (i.e., the link from the mobile terminal to the base station). The slowing down of the observed channel fluctuations is effectuated on the downlink by 1) obtaining a signal whose Doppler shift range is a proper subset (i.e. is less than) of the combined Doppler shift range of all of the received signals, such a signal is referred to herein as a Doppler-compensatable signal, and 2) processing the Doppler-compensatable signal to compensate for the Doppler shift. The Doppler-compensatable signal can be obtained for example by 1) receiving a signal, such as a directional signal, whose Doppler shift range is a proper subset of the combined Doppler shift range of a plurality, or all, of the received signals, or 2) calculating a signal from the received signals where the Doppler shift range of the calculated signal is a proper subset of the combined Doppler shift range of a plurality, or all, of the received signals.

In one embodiment of the invention, the Doppler-compensatable signals are calculated from received signals in a beam-forming module. Some or all of these calculated Doppler-compensatable signals are compensated for their respective Doppler shifts in a Doppler-compensation module. In another embodiment of the invention, the Doppler-compensatable signals are received over directional antennas. Some or all of these received Doppler-compensatable signals are processed to compensate them for their respective Doppler shifts. The Doppler shift compensation can also be performed in the Doppler-compensation module.

The slowing down of the observed channel fluctuations is effectuated on the uplink by pre-compensating symbol streams for a Doppler shift. This can be accomplished by, for example, obtaining the respective Doppler shifts of signals received from particular directions. The signal to be transmitted is pre-compensated with the Doppler shift obtained for one of the directions, and the pre-compensated signal is transmitted in that direction. Optionally, the signal can be divided into several copies, with each copy pre-compensated with the respective Doppler shift obtained for the direction in which the copy is to be transmitted. The pre-compensated copies are then transmitted in the respective direction for which they were pre-compensated. Transmitting the signals in these directions, i.e. transmitting them so that they form directional beams (i.e., signals transmitted in a particular direction) can be accomplished by 1) transmitting the signals on directional antennas, or 2) by processing the copies of the signals so that they are transmitted on a plurality of antennas such that the transmitted signals combine constructively in a particular direction, or set of directions, and combine destructively in other directions. Thus, the observed Doppler shift of these signals when they are received is reduced or even eliminated.

The Doppler-compensatable signals should not completely overlap, i.e. they should not correspond to the identical range of angles. Optionally, the number of Doppler-compensatable signals is at least equal to the number of receive antennas.

Reducing the observed rate of change of the channel characteristics in a multi-output system allows the channel characteristics to be acceptably determined by averaging over a significantly long period of time and still accurately estimate the channel. This allows the receiver to determine the channel characteristics, which in turn allows the transmitted signal 1) to be transmitted at a higher data rate than if the receiver did not know the channel characteristics, and 2) still be separated out and decoded with acceptable error rates.

BRIEF DESCRIPTION OF THE DRAWINGS

FIG. 3 illustrates a receiver;

The figures are not drawn to scale and illustrate the interconnectivity of the depicted systems and not necessarily their spatial layout and physical dimensions.

DETAILED DESCRIPTION OF ILLUSTRATIVE EMBODIMENTS

Figure 1:
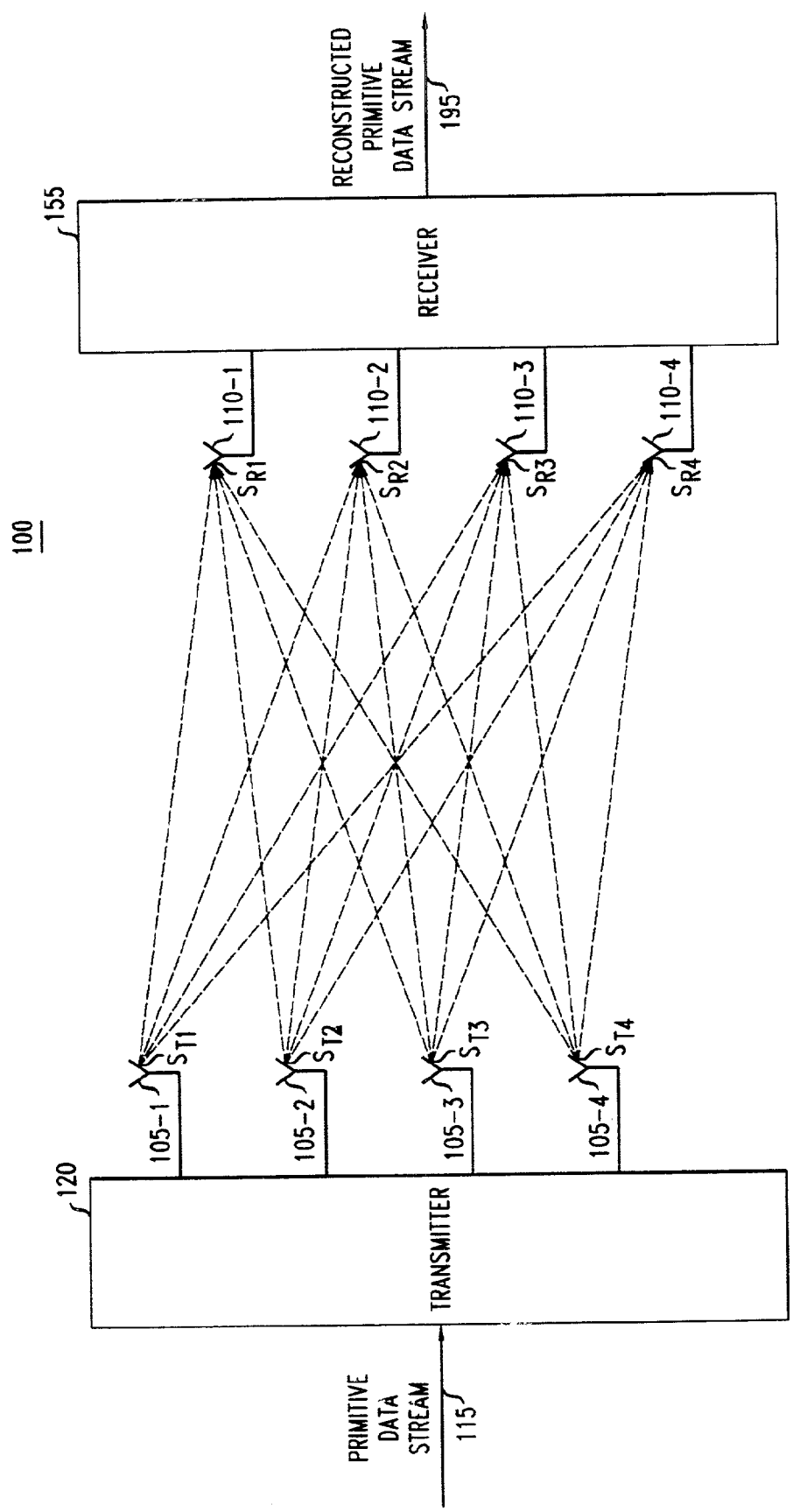
FIG. 1 illustrates the signals traveling between a transmitter and a receiver in a multi-input, multi-output wireless communication system.

FIG. 1 shows a multi-input, multi-output wireless communication system 100 having four transmit antennas 105-1, 105-2, 105-3 and 105-4, and four receive antennas 110-1, 110-2, 110-3 and 1104. In system 100, primitive data stream 115 (i.e., the data stream to be transmitted) is supplied to transmitter 120. Transmitter 120 processes primitive data stream 115 using well-known techniques. In an illustrative embodiment of the invention, transmitter 120 divides primitive data stream 115 into data sub-streams. The data sub-streams can be channel coded and are mapped into symbol space to produce symbol sub-streams. The symbol sub-streams are space-time coded to form space-time coded symbol sub-streams, which are transmitted over antennas 105-1, 105-2, 105-3, and 105-4.

The signal path between a transmit and receive antenna is commonly referred to as a channel. Each channel has its own channel characteristic. The channels between each pair of transmit and receive antennas are shown in FIG. 1. Typically, the received signal $S_{R1}$, $S_{R2}$, $S_{R3}$, and $S_{R4}$ at each of the receive antennas 110-1, 110-2, 110-3 and 110-4, respectively, is a superposition of the transmitted signals $S_{T1}$, $S_{T2}$, $S_{T3}$, and $S_{T4}$, modified by the channel characteristics of the channels over which the transmitted signals traveled, plus noise. As described above, even though the transmitted signals interfere with each other, these signals can be processed to separate the transmitted signals from one another. The separated-out signals can be decoded to recover the respective data sub-streams, which would then be multiplexed together to get the reconstructed primitive data stream 195.

An illustrative, known, receiver 355 that can be used in a multi-input, multi-output system is shown in FIG. 3 and is now briefly described. The problems with the operation of such a receiver are described below with reference to FIG. 2.

Receiver 355 includes receive antennas 110-1, 110-2, 110-3 and 110-4 that supply the received signal to the receiver processing section 330 and to channel estimators 335-1, 335-2, 335-3 and 335-4. Optionally, just the portion of the signal that contains the training sequences is supplied to the channel estimators. Each channel estimator determines the channel characteristics of the channel between the receive antenna to which it is coupled and each of the non-idle transmit antennas. For example, channel estimator 335-1 determines the channel characteristics of the channels between: 1) receive antenna 110-1 and transmit antenna 105-1; 2) receive antenna 110-1 and transmit antenna 105-2; 3) receive antenna 110-1 and transmit antenna 105-3; and 4) receive antenna 110-1 and transmit antenna 105-4. As described above, to determine the channel characteristics with the desired accuracy, the received training sequences are averaged over time. (Note, the desired accuracy is one where the obtained training sequences can be used to determine the channel characteristics accurately enough to enable decoding of the information in the received signal with a desired error rate, the latter being for example 1% for voice and 10% for data.) The averaged training sequences are then processed to obtain the channel characteristics between the transmit antennas over which they had been transmitted and the receive antenna connected to the channel estimator. The channel characteristics are then supplied to receiver processor section. The operation of the receiver processing section 330 is described below with reference to FIGS. 3, 5 and 6.

Figure 2:
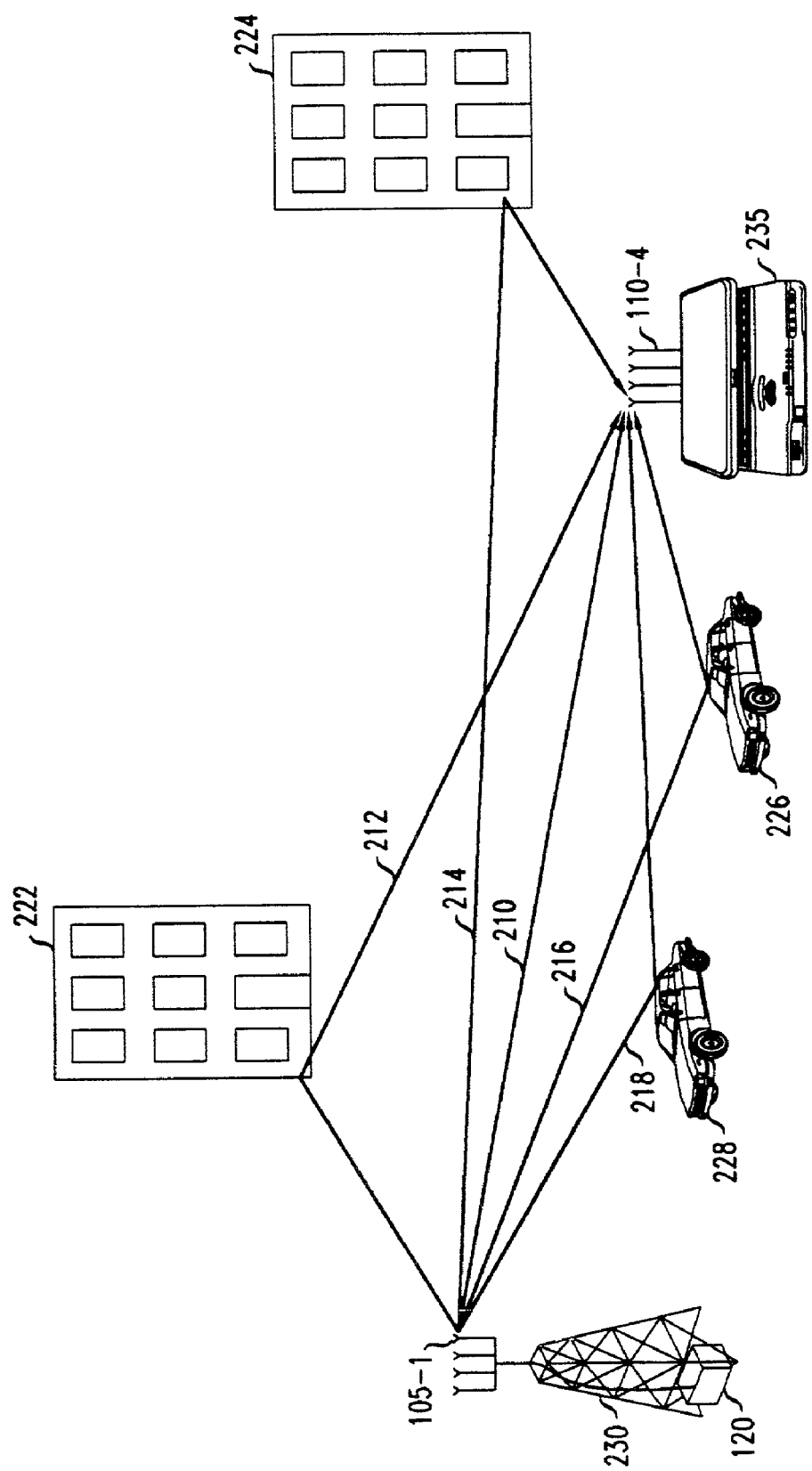
FIG. 2 illustrates the multipaths of one of the signals in FIG. 1.

Returning again to FIG. 1, FIG. 1 shows the direct path between the transmit and receive antennas. However, typically there are many multipaths between each pair of transmit and receive antennas. FIG. 2 shows the multipaths between one such pair, particularly transmit antenna 105-1, at base station 230, and receive antenna 110-4, at mobile terminal 235. The transmitted signal is radiated from transmit antenna 105-1. Depending on the obstacles encountered by the transmitted signal, some of the transmitted signal, i.e. multipath 210, travels directly to the receive antenna, and some of the transmitted signal is reflected off obstacles, such as buildings 222 and 224, and cars 226 and 228, forming multipaths 212, 214, 216, and 218, respectively. Multipaths of a signal are portions of the signal that travel from the transmit antenna 105-1 to the receive antenna 110-4 via different paths. For example, multipath 212 is produced when the transmitted signal 210 building 222 and a portion of signal 210 is reflected off of building 222 to eventually get to receive antenna 110-4. When multipaths 210, 212, 214, 216, and 218 reach receive antenna 110-4 they can be out of phase with each other, in which case they would destructively interfere with each other. As mobile terminal 235 moves the phases of the multipaths with respect to each other change, and the multipaths interfere differently with each other. For example, the multipaths can still interfere destructively but by a different amount, or they can now interfere constructively.

As described above, in a single antenna system, due to noise and interference, particularly from the multipaths of the same signal, training sequences may not be received with the desired accuracy. And, in some systems, this is alleviated by averaging at the receiver the received training sequences over time to obtain the training sequences more accurately and thus to be able to more accurately obtain the channel characteristics from these training sequences.

In multi-input systems, such as the one shown in FIGS. 1, 2 and 3, the signals transmitted by the multiple transmit antennas typically interfere with each other more than signals in single antenna systems. This increase in interference is usually due to the signals being transmitted concurrently, at about the same power levels, from fairly closely spaced multiple transmit antennas 105-1, 105-2, 105-3, and 105-4. Each of the transmitted signals is interfered with by the other concurrently transmitted signals and by their own multipaths. This high level of interference makes it difficult to estimate the channel characteristics from the received training sequences with the desired accuracy. As in single antenna systems, the received signal can be averaged over time. However, due to the higher level of interference in multiple-input systems the averaging of the training sequences needs to be over a longer period of time to acceptably determine the channel characteristics. This raises a serious problem in determining channel characteristics when the channel is changing at, or quicker than, a moderate rate, such as, when a mobile terminal is moving at, or quicker than, a moderate rate, such as 17 miles/hour. In such a case, the signals modified by channel characteristics that have long since changed is still being used by channel estimators 335-1, 335-2, 335-3, and 335-4, in determining the channel characteristics. Thus, the channel characteristics that are obtained at the receiver in such a case are inaccurate. Therefore, the receiver does not know the channel characteristics, which requires a reduction in the data rate of the transmitted signal for it to be separated out and decoded with acceptable error rates.

Figure 4A:
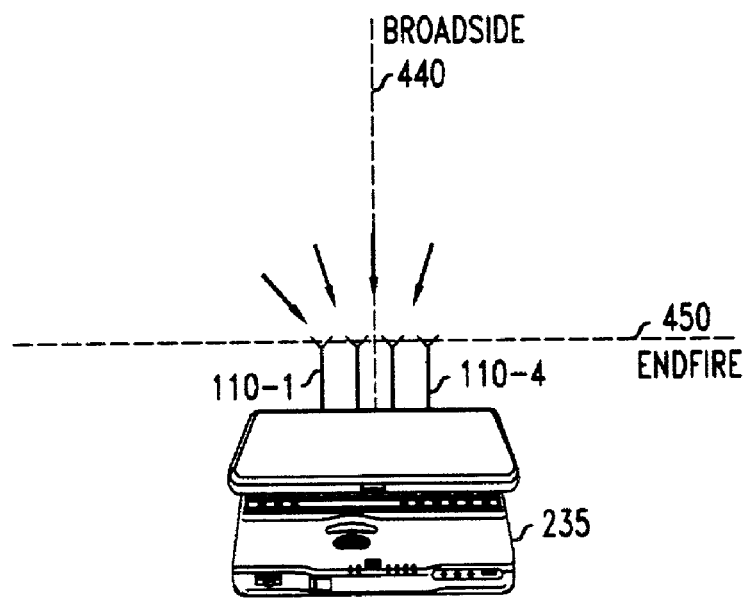
FIG. 4A illustrates a mobile terminal in accordance with an embodiment of the invention.
Figure 4B:
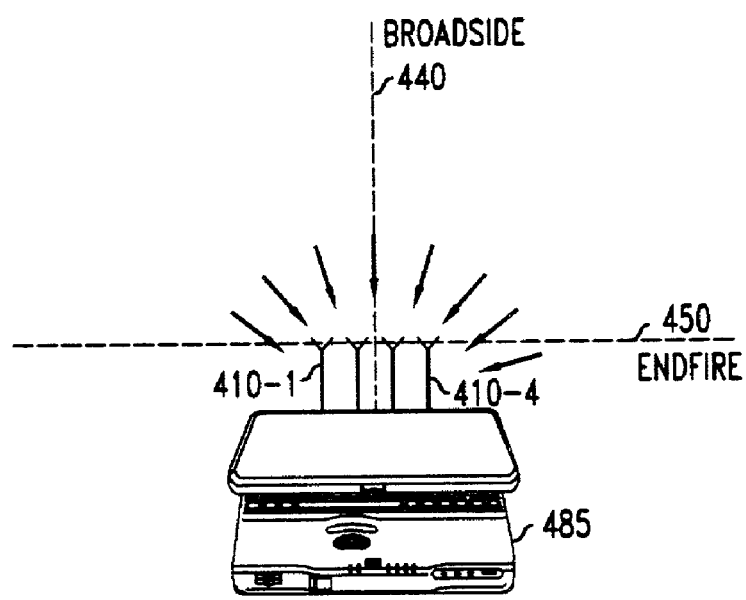
FIG. 4B illustrates a mobile terminal in accordance with another embodiment of the invention.

The present inventors have recognized that it is possible to reduce the observed rate of change of the channel characteristics in a multi-output system, and that this reduction is particularly advantageous in a multi-input, multi-output system. This apparent slowing down of the channel fluctuations is achieved on the downlink, by obtaining Doppler-compensatable signals and compensating these signals for their Doppler shift. The Doppler-compensatable signals, shown in FIGS. 4A and 4B, are 1) received at mobile terminal 235 and 485, respectively or 2) calculated from the received signals at mobile terminal 235 and 485, respectively. On the uplink, signals are pre-compensated for the expected Doppler shift such that when the transmitted signals (shown in FIGS. 11A and 11B) are received, the observed Doppler shift is reduced or eliminated.

Figure 7:
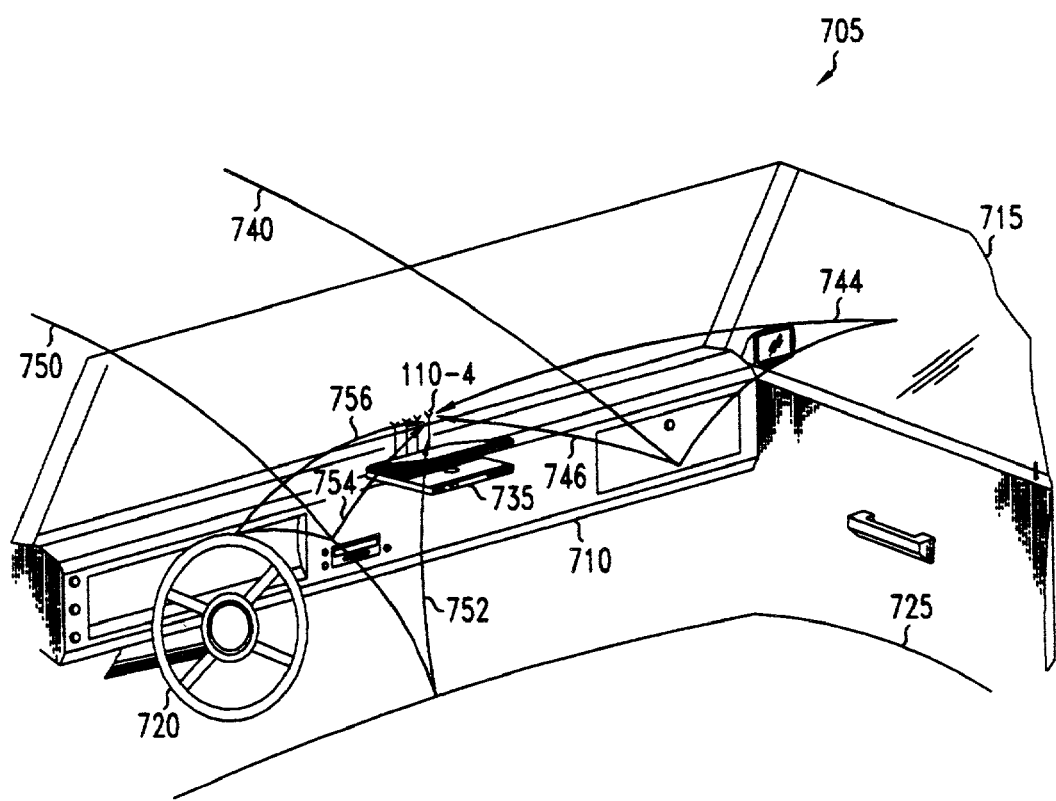
FIG. 7 illustrates a mobile terminal in a locally scattering environment.

The reduction of the observed rate of change of the channel characteristics is first described for the downlink, for the case where the Doppler-compensatable signals are directional signals calculated from the received signals. A calculated directional signal to a mobile terminal (i.e. a directional signal received at a mobile terminal) is one that is a composition of the signals that arrive from the angle range corresponding to the directional signal. In some environments, particularly in environments that are not locally scattering, signals that arrive from contiguous angles (or are calculated to be a composition of the signals that arrive from a contiguous angle range) have a similar Doppler shift. (Note, a locally scattering environment, as shown in FIG. 7, is one in which there are many objects off of which received signals can be (and typically are) reflected prior to being received by the receive antennas, where the signals received from different directions can have the same Doppler shift.)

Figure 5:
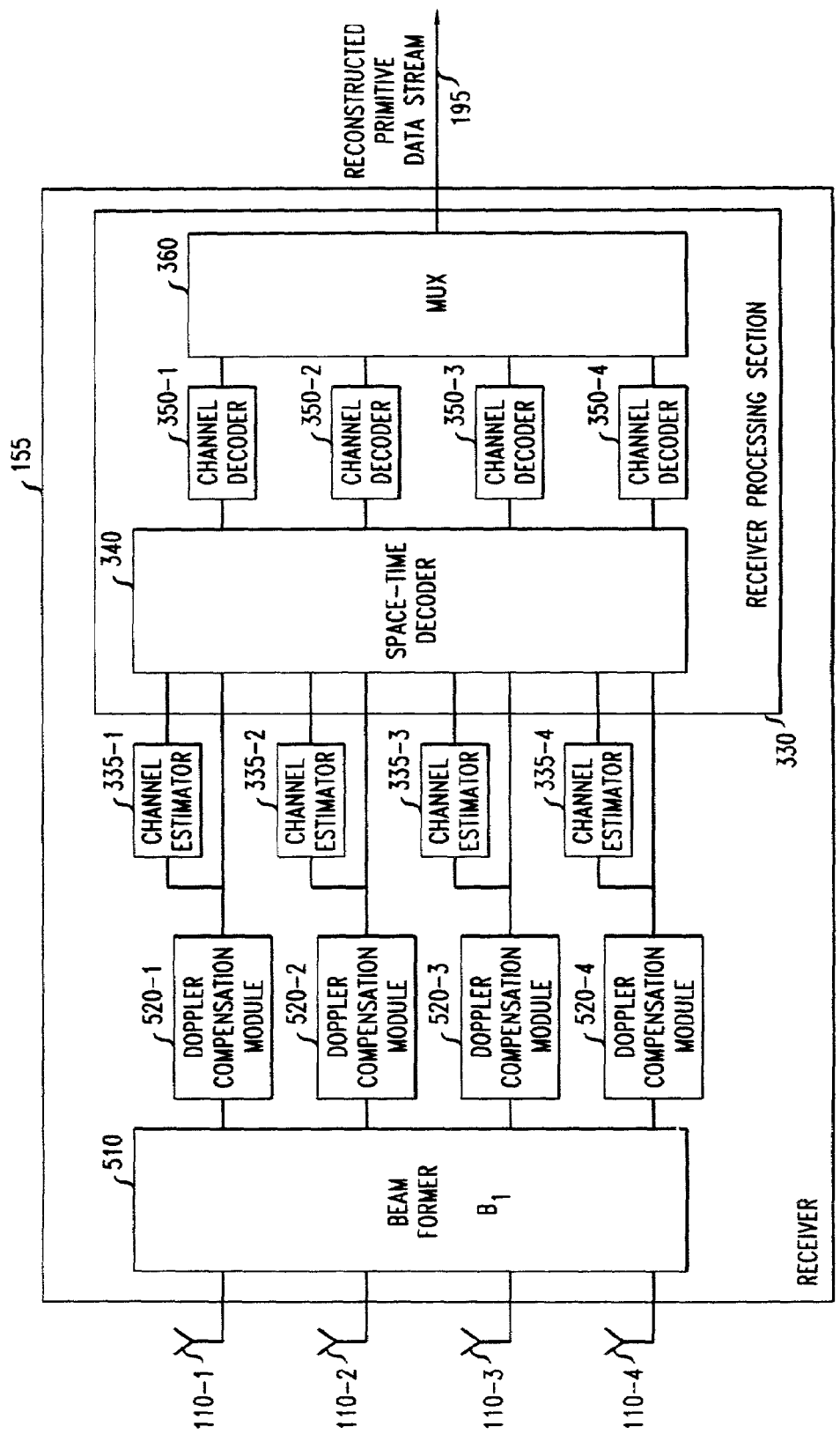
FIG. 5 illustrates a receiver of the mobile terminal of FIG. 4A.
Figure 6A:
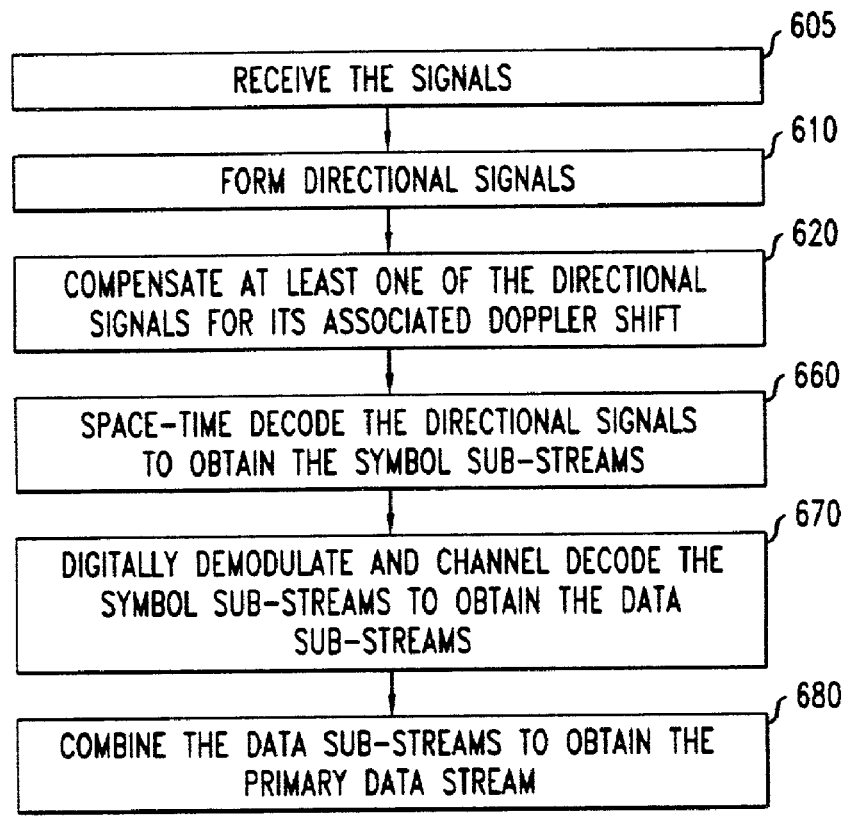
FIG. 6A is a flowchart illustrating a method of processing a received signal in accordance with an embodiment of the invention.
Figure 6B:
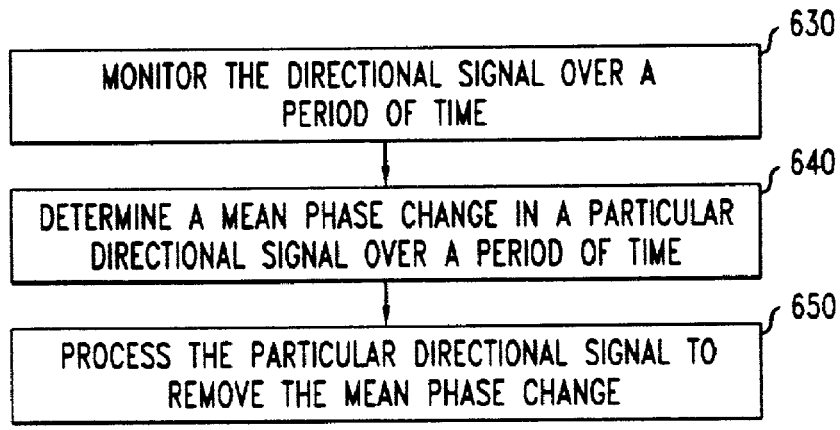
FIG. 6B is a flowchart illustrating in more detail an illustrative embodiment of the Doppler compensation step of the method of FIG. 6A.

FIG. 5, shows in more detail receiver 155 the operation of which in accordance with an embodiment of the invention is described in reference with FIG. 6A. Receiver 155 is similar to receiver 355, but has additional functionally that is in accordance with an embodiment of the invention. Receiver 155 includes receive antennas 110-1, 110-2, 110-3, and 110-4 that receive signals, step 605 of FIG. 6A. The received signals are then processed in beam-former 510 to calculate directional signals, step 610. Beam-former 510 can form any number of directional signals. However, preferably the number of directional signals formed is equal to the number of receive antennas, as shown in FIG. 4A, or is larger than the number of receive antennas, as shown in FIG. 4B.

The directions of the calculated directional signals correspond to respective ranges of angles. Each directional signal is a composition of the signals that arrive from the angle range corresponding to the directional signal. That is, beam-former 510 calculates directional signals, each of which represents a signal that would have been received by a directional antenna that covers the angle range corresponding to the directional signal. The center of the angle range is typically referred to as the direction of the directional antenna, and is referred to herein as the direction of the directional signal.

The angle range is commonly referred to as the width of the directional signal. It is preferable for the directional signal to be narrow, meaning that the width of its corresponding angle range is small. As described in more detail below a preferred angle range is less than or equal to 45°. A narrower range is preferred because typically signals from angles close to each other have Doppler shift that are close to each other. The width of a calculated directional signal is dependent on the arrangement of the receive array. Particularly, for a linear array the width is inversely proportional to the size of the aperture of the array, where the aperture size of the array is the physical extent of the array, i.e. the size of the array from end to end. For example, for the four-antenna case of the illustrative embodiment where the antennas are spaced ½λ apart, the aperture size is λ, and the width of the Doppler-compensatable signals is about ⅜λ, where λ is the wavelength of the signals. Thus, the Doppler-compensatable signal width for a so-called broadside directional signal is $$.886 \frac{\lambda}{Nd} \text{ radians} = .886 \frac{\lambda}{4\frac{\lambda}{2}} \text{ radians} = 25°,$$

where N is the number of antennas, and d is the distance between two antennas.

The directions of the directional signals can overlap, but should not overlap completely, that is the directional signals should not correspond to the same angle range. Preferably, the directional signals do not overlap by a large amount, but should be spaced-out to cover most of the available angular range of 360°. If the antennas are positioned on back of a laptop, 180° are typically blocked by the laptop and only 180° are available for propagating a signal. Thus, the antennas cover half of the angular range of 360°, such antennas are referred to as the antennas are half-space antennas. In this case, the directional signals are preferably spaced-out to cover most of the angular range of 180°. Also, preferably, the directions of the signals should be such that no ambiguity lobes develop, where having an ambiguity lobe means that signals from two or more distinct ranges of angles are received with equal strength.

The directional signals can have any direction. However, it is preferable for the direction of the signals to be closer to broadside 440 (i.e. perpendicular to the line of sight of the receive antenna array), shown in FIG. 4A. This is because narrower directional signals can be formed along the broadside. Particularly, it is preferable for the direction of one of the directional signals to be broadside 440, or at least the direction of at least one of the signals is preferably closer to the broadside than to endfire 450 (i.e., the line of sight of the receive antenna array).

Thus, as described above, beam-former 510 generates the directional signals, step 610. The directional signals can be formed in any appropriate manner. In the illustrative embodiments the directional signals are formed as a function of the desired directions ($k_q$) of the signals and the locations of the antennas ($r_m$). Beam-forming module 510 can be a processor, or a multiplier that calculates a directional signal by multiplying column vector of the received signals at time t by:

$$\frac{1}{\sqrt{R}} [A_{q1} e^{-ik_q \cdot r_1} A_{q2} e^{-ik_q \cdot r_2} \dots A_{q(R-1)} e^{-ik_q \cdot r_{R-1}} A_{qR} e^{-ik_q \cdot r_R}], \quad (1)$$

where R is the number of receive antennas elements, $k_q$ is the vector pointing to the direction of the directional signal, $r_m$ is the location of $m^{th}$ antenna with respect to a reference point, and $A_{qm}$ is the amplitude weight applied to the received signal from the $q^{th}$ direction received over the $m^{th}$ antenna. This weighting can be any value. Illustratively, all of the weights can be set to one, or the weights can be proportional to the square root of the average power received over the $m^{th}$ antenna from the $q^{th}$ direction, in the latter case, the proportionality constant should be the same for all As. More particularly, $k_q$ points to the center the angle rage of a directional signal, and is $2\pi/\lambda$ times the direction of the directional signal, where λ is the wavelength of the received signals. The value of $k_q$ can be varied to calculate additional directional signals. The reference point can be any reference point, such as, for example, the location of one of the antennas, such as antenna 110-1. The reference point is preferably the same reference point for all of the antennas. For example, the reference point can be the location of one of the antennas.

The received signals can be multiplied individually by versions of equation (1), each version having a different value of $k_q$, or the column vector of the received signals can be multiplied by the matrix $B_1$.

$$B_1 = \frac{1}{\sqrt{R}} \begin{bmatrix} A_{11} e^{-ik_1 \cdot r_1} & A_{12} e^{-ik_1 \cdot r_2} & \cdots & A_{1(R-1)} e^{-ik_1 \cdot r_{R-1}} & A_{1R} e^{-ik_1 \cdot r_R} \\ A_{21} e^{-ik_2 \cdot r_1} & A_{22} e^{-ik_1 \cdot r_2} & \cdots & A_{2(R-1)} e^{-ik_2 \cdot r_{R-1}} & A_{2R} e^{-ik_2 \cdot r_R} \\ \vdots & \vdots & \vdots & \vdots & \vdots \\ A_{R1} e^{-ik_R \cdot r_1} & A_{R2} e^{-ik_R \cdot r_2} & \cdots & A_{R(R-1)} e^{-ik_R \cdot r_{R-1}} & A_{RR} e^{-ik_R \cdot r_R} \\ \vdots & \vdots & \cdots & \vdots & \vdots \end{bmatrix} \quad (2)$$

The result of multiplying the column vector of the received signals by a row of matrix $B_1$ is one calculated directional signal. The directional signals are the result of multiplying the received signals by the matrix $B_1$, with the number of signals formed equal to the number of rows in matrix $B_1$.

Thus, for receiver 155, where each of four receive signals are received on one of the four antennas 110-1, 110-2, 110-3, and 1104, respectively, matrix $B_1$ is:

$$B_1 = \frac{1}{\sqrt{4}} \begin{bmatrix} A_{11}e^{-ik_1 \cdot r_1} & A_{12}e^{-ik_1 \cdot r_2} & A_{13}e^{-ik_1 \cdot r_3} & A_{14}e^{-ik_1 \cdot r_4} \\ A_{21}e^{-ik_2 \cdot r_1} & A_{22}e^{-ik_2 \cdot r_2} & A_{23}e^{-ik_2 \cdot r_3} & A_{24}e^{-ik_2 \cdot r_4} \\ A_{31}e^{-ik_3 \cdot r_1} & A_{32}e^{-ik_3 \cdot r_2} & A_{33}e^{-ik_3 \cdot r_3} & A_{34}e^{-ik_3 \cdot r_4} \\ A_{41}e^{-ik_4 \cdot r_1} & A_{42}e^{-ik_4 \cdot r_2} & A_{43}e^{-ik_4 \cdot r_3} & A_{44}e^{-ik_4 \cdot r_4} \end{bmatrix}. \quad (3)$$

Expressing k in rectangular coordinates, i.e. k=(x,y), $$k_1 = \left[\frac{2\pi}{\lambda} \sin C_1, \frac{2\pi}{\lambda} \cos C_1\right],$$

where $k_1$ is the signal directed along the broadside, i.e. $C_1=0°$, $$k_2 = \left[\frac{2\pi}{\lambda} \sin C_2, \frac{2\pi}{\lambda} \cos C_2\right],$$

where $C_2=30°$, $$k_3 = \left[\frac{2\pi}{\lambda} \sin C_3, \frac{2\pi}{\lambda} \cos C_3\right],$$

where $C_3=-30°$, $$k_4 = \left[\frac{2\pi}{\lambda} \sin C_4, \frac{2\pi}{\lambda} \cos C_4\right],$$

where $C_4=60°$.

In this illustrative embodiment, the antennas are half-space antennas, the directional signals width is 30°, and the signal directions chosen are 0°, 30°, −30°, 60° with respect to the broadside of the receive antenna array. These width and directions are chosen because these are the narrowest width signals that can be formed with a four antenna array where the antennas are spaced ½λ apart, one of the directions is along the broadside, and the rest of the directions are as close to the broadside as they can be with the smallest amount of overlap.

The angle range can be any appropriate angle range. There is a tradeoff between 1) narrowing the angle range (i.e. reducing width), as this slows down the observed channel fluctuations, and 2) covering most of the available angular range, which is 180° for half-space antennas and 360° for omni antennas. Compensating for a Doppler shift range of directional signals whose angle range is greater than 45° does not significantly slow down the channel fluctuations, so preferably, the angle range is any value less than or equal to 45°.

As described above, $r_m$ is the location of the $m^{th}$ antenna element with respect to a reference point. In the illustrative embodiment, the antenna array is linear and the reference point is the location of antenna 110-1. So, $r_1=0$, $r_2=\lambda/2$, $r_3=\lambda$, $r_4=3\lambda/2$.

Each of the directional signals formed by beam-former 510 has a Doppler shift range. Each of these Doppler shift ranges is a proper subset of the combined Doppler shift range of all of the received signals; that is the Doppler shift range of any directional signal is smaller than the combined Doppler shift ranges of all of the received signal. For example, as described above, preferably each directional signal corresponds to an angle range of at most 45°, so the extent (i.e. the difference between the highest and lowest value) of the Doppler shift range should be the total range of the Doppler shifts of the received signals divided by the following: the available angle range divided by the angle range of the directional signal. For the case where the antennas are half-space antennas, each directional signal corresponds to an angle range of about 25°, the directional signals do not overlap at all, and the total Doppler shift range is 200 Hz, the extent of the Doppler shift range is about 50 Hz, and the Doppler shift ranges are about 0 to 50 Hz, 50 to 100 Hz, 100 to 150 Hz, and 150 to 200 Hz. Each directional signal has one of these Doppler shift ranges, respectively.

The formed directional signals are then compensated for their associated Doppler shift in respective Doppler-compensation modules 520-1, 520-2, 520-3, and 520-4, step 620. In the illustrative embodiment, step 620 can be broken down into the steps shown in FIG. 6B. The Doppler-compensation modules determine the Doppler shift and then compensate the signals for this Doppler shift. Determining the Doppler shift associated with any particular signal can be accomplished in any appropriate manner. One way of determining the Doppler shift for a particular directional signal is by monitoring the phase of directional signal over time, step 630. The Doppler shift would manifest itself as a phase progression in the directional signal, i.e. it is the mean rate of the phase change of the directional signal. The Doppler shift can then be calculated from the mean phase progression of the directional signal, step 640. After determining the Doppler shift the Doppler-compensation module would then remove the mean phase progression, step 650. The removal of the Doppler shift can be accomplished in any appropriate manner, such as, for example, with a phase-lock loop. When the Doppler shift is a Doppler shift range, removing the Doppler shift can be accomplished by removing one of the Doppler shifts in the Doppler shift range, such as, for example, the center of the range. The monitoring, determination, and removal steps can be performed in the same module as shown in FIG. 5, or the functionality can be split up into separate modules.

Although FIG. 5 shows a Doppler-compensation module for each directional signal and each directional signal is compensated for its associated Doppler shift, alternatively any number from as few as one to as many as the number of the directional signals can be Doppler compensated. The signals that are not Doppler compensated either pass through the Doppler-compensation module without being compensated, or by-pass the Doppler-compensation module entirely. Additionally, receiver 155 may only have Doppler-compensation modules for the directional signals being compensated. Furthermore, although each Doppler-compensation module is shown as a separate unit, the Doppler compensation for all of the directional signals being compensated may be performed, either in parallel or in series, in the same physical unit.

Although, the beam-forming module and the Doppler-compensation module are shown as two modules in FIG. 5, they can be the same module, for example both modules can be performed by the same software, or hardware, in either the same or different processors. Additionally, the beam-forming module and the Doppler-compensation module can be in either the same or in different physical units, whether or not they are the same module.

Due to the compensation of the directional signals for their Doppler shifts, when mobile terminal 235 moves, the phase of the multipaths to mobile terminal 235, as observed at mobile terminal 235, no longer change as rapidly (or at all) with respect to each other. This reduction in the rate of change of the phase shifts of the multipaths produces a reduction in the observed rate of change of the channel characteristics in a multi-output system. The reduction in the observed rate of change of the channel characteristics allows the channel characteristics to be acceptably determined by averaging over a sufficiently long period of time.

After the directional signals are Doppler shift compensated, they are supplied to channel estimators 335-1, 335-2, 335-3 and 335-4. Channel estimators 335-1, 335-2, 335-3 and 335-4 determine the channel as described above, except the channel they are determining now is the channel of the calculated directional signals. The channel estimators compare the training sequences in the calculated directional signal to the expected training sequences. The channel characteristics are based on the differences between the training sequences of the calculated directional signal and the expected training sequences. However, as described above, because of the Doppler compensation, the channel for the calculated directional channel does not change as rapidly and the training sequences can be averaged over a longer period of time in determining the channel characteristics. And thus, the determined channel characteristics are more accurate. The channel characteristics are then supplied to receiver processing section 330.

Receiver processing section 330 also receives the Doppler compensated directional signals. The receiver processing section can be any appropriate receiver processing section that uses channel estimates. An illustrative receiver processing section 330 is shown in FIGS. 3 and 5. Receiver processing section includes space-time decoder 340 that uses the channel characteristics provided by the channel estimators 335-1, 335-2, 335-3 and 335-4 to space-time decode the sub-streams of the primary data stream and to decode any space-time coding performed in the transmitter, step 660 of FIG. 6A. Any space-time decoding can be used, such as, for example, horizontal space-time decoding, vertical space-time decoding, or a layered space-time decoding, such as for example the decoding described in S. Pat. No. 6,097,771 entitled "Wireless Communications System Having A Layered Space-Time Architecture Employing Multi-Element Antennas," hereby incorporated by this reference.

The space-time-decoded sub-streams are decoded and de-mapped (from symbol space into bit space) in decoders 350-1, 350-2, 350-3, and 350-4, respectively, step 670. The decoding performed by decoders 350-1, 350-2, 350-3, and 350-4 is typically the inverse of that performed by the encoders of transmitter 155. The outputs of decoders 350-1, 350-2, 350-3, and 350-4 are interleaved in multiplexer (MUX) 360 to reconstruct the symbol stream, forming reconstructed primitive data stream 195, step 680.

In an alternative embodiment of the invention, the Doppler-compensatable signals can be calculated from the received signals that have the same Doppler shift regardless of the direction from which these signals are received. This embodiment is particularly useful when the mobile terminal is located in a locally scattering environment, such as a car 705 shown in FIG. 7, or a crowded commuter train. In such an environment, the multipaths 740 and 750 traveling to mobile terminal 735 are reflected off of the local environment, such as dashboard 710, windowpane 715, steering wheel 720, and seat 725. Multipath 740 has a certain Doppler shift and the additional multipaths 744 and 746 formed from multipath 740 have Doppler shifts very close to that of multipath 740. However, as can be seen, these multipaths are coming from different directions. Similarly, multipath 750 has a certain Doppler shift and the additional multipaths 752, 754, and 756 formed from multipath 750 also have Doppler shifts very close to that of multipath 750, yet these multipaths 752, 754, and 756 are coming from a different direction then multipath 750.

Figure 8:
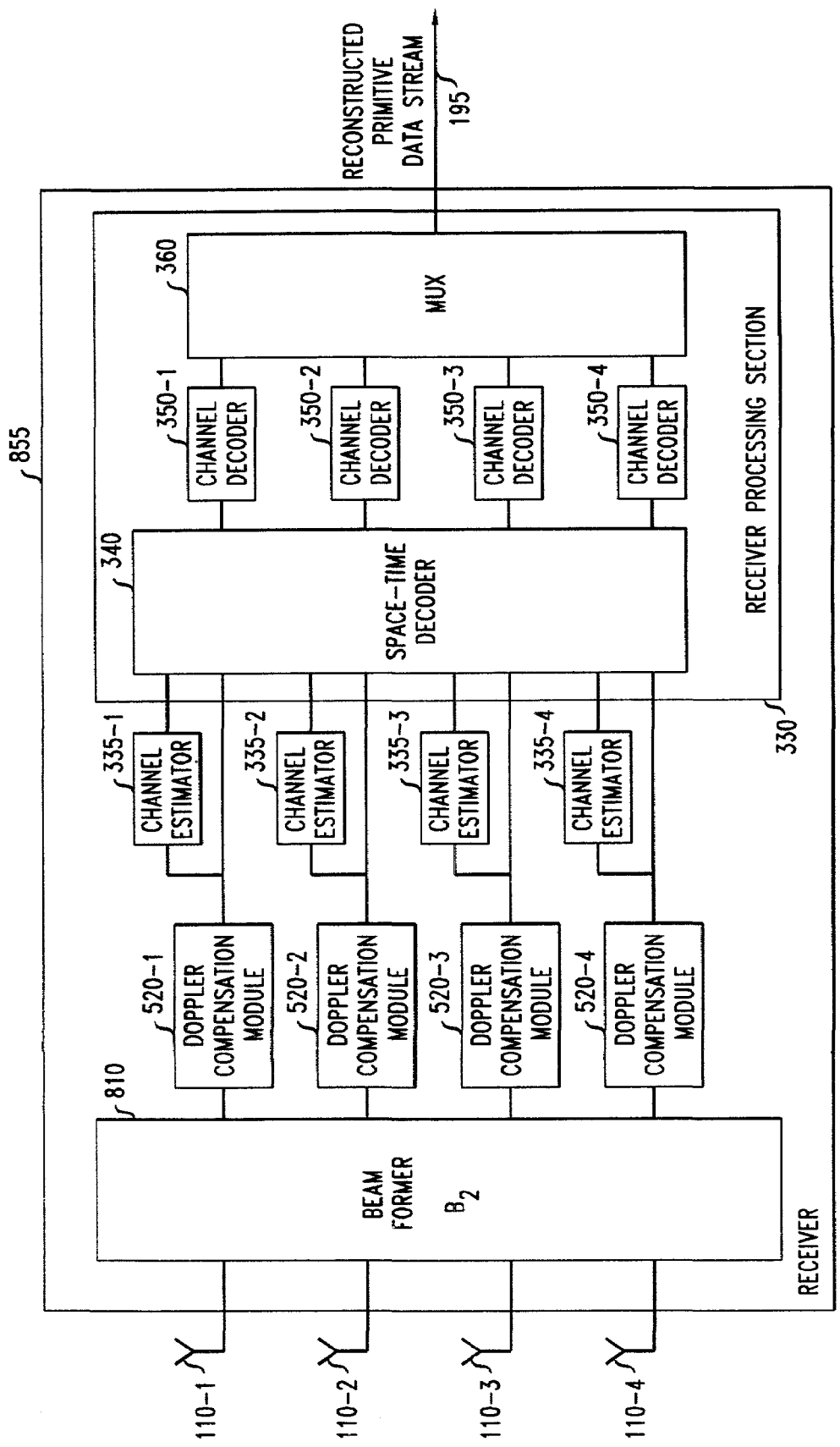
FIG. 8 illustrates a receiver of the mobile terminal of FIG. 7 in accordance with an embodiment of the invention.

In this illustrative embodiment, shown in FIG. 8, step 610 of FIG. 6A of calculating the directional signals is accomplished differently than in the embodiment shown in FIG. 5. In this embodiment, the Doppler-compensatable signals are calculated as a function of the Doppler shift range of the received signals. Receiver 855 includes beam-former 810 that determines the Doppler shift of the received signals and calculates Doppler-compensatable signals where each signal is a composition of the received signals (or portions thereof) that have a Doppler shift within a respective Doppler shift range. Such Doppler-compensatable signals can be calculated in any appropriate manner. For example, the Doppler shift on all antennas can be observed concurrently, or simultaneously. The Doppler shift on a particular antenna can be observed by, for example, taking a short-time Fourier transform of the signals received on the antenna. This produces a spectral decomposition of the arriving signal. The short-time Fourier transform can be performed for all the antennas, and the results grouped by creating a composite signal of all of the signals that have the same Doppler shift.

The particular Doppler shifts ranges can be determined in any appropriate manner. For example, the particular Doppler shift ranges can be determined by dividing the total Doppler shift range of any of the signals (as observed from the short-time Fourier transform) by the desired number of Doppler-compensatable signals, which can, for example, be equal to the number of receive antennas. Ranges can then be selected around such Doppler shifts, with each Doppler shift being within a Doppler shift range. Preferably, the size of the Doppler shift ranges is less than or equal to the total range of the Doppler shifts of the received signals divided by the number of receive antennas. Each of the Doppler-compensatable signals corresponds to one the Doppler shift ranges, respectively. The Doppler-compensatable signal is a function of the phase, $\phi_m(\omega_n)$, of the received signal on antenna m with a Doppler shift of $\omega_n$.

Beam-forming module 810 can be a processor, or a multiplier, that multiplies the received signal by:

$$\frac{1}{\sqrt{R}}[A_{n1}e^{-i\varphi_1(\omega_n)}A_{n2}e^{-i\varphi_2(\omega_n)}\ldots A_{n(R-1)}e^{-i\varphi_{R-1}(\omega_n)}A_{nR}e^{-i\varphi_R(\omega_n)}], \quad (4)$$

where R is the number of receive antennas elements, $\phi_m(\omega_n)$ is the phase shift of the received signal on the $m^{th}$ antenna for the $n^{th}$ Doppler shift, $\omega_n$ is the $n^{th}$ particular Doppler shift, $A_{nm}$ is the amplitude weight applied to the received signal received over the $m^{th}$ antenna with the $n^{th}$ Doppler shift. The reference antenna can be any of the antennas, such as, for example, antenna 110-1.

The Doppler-compensatable signals can be obtained by multiplying the received signal by versions of equation (4), with each version based on one of the Doppler shifts as determined above. Alternatively, the Doppler-compensatable signals can be obtained by multiplying the column vector of the received signals by matrix $B_2$, with each Doppler-compensatable signal being the product of the received signal and a row of the matrix.

$$B_2 = \frac{1}{\sqrt{R}} \quad (5)$$

$$\begin{bmatrix} A_{11}e^{-i\varphi_1(\omega_1)} & A_{12}e^{-i\varphi_2(\omega_1)} & \cdots & A_{1(R-1)}e^{-i\varphi_{R-1}(\omega_1)} & A_{1R}e^{-i\varphi_R(\omega_1)} \\ A_{21}e^{-i\varphi_1(\omega_2)} & A_{22}e^{-i\varphi_2(\omega_2)} & \cdots & A_{2(R-1)}e^{-i\varphi_{R-1}(\omega_2)} & A_{2R}e^{-i\varphi_R(\omega_2)} \\ \vdots & \vdots & \vdots & \vdots & \vdots \\ A_{RJ}e^{-i\varphi_1(\omega_R)} & A_{R2}e^{-i\varphi_2(\omega_R)} & \cdots & A_{R(R-1)}e^{-i\varphi_{R-1}(\omega_R)} & A_{RR}e^{-i\varphi_R(\omega_R)} \\ \vdots & \vdots & \cdots & \vdots & \vdots \end{bmatrix}$$

Thus, for receiver 855, where the received signals are received on one of the four antennas 110-1, 110-2, 110-3, and 110-4, respectively, matrix $B_2$ is:

$$B_2 = \frac{1}{\sqrt{4}} \begin{bmatrix} A_{11}e^{-i\varphi_1(\omega_1)} & A_{12}e^{-i\varphi_2(\omega_1)} & A_{13}e^{-i\varphi_3(\omega_1)} & A_{14}e^{-i\varphi_2(\omega_1)} \\ A_{21}e^{-i\varphi_1(\omega_2)} & A_{22}e^{-i\varphi_2(\omega_2)} & A_{23}e^{-i\varphi_3(\omega_2)} & A_{24}e^{-i\varphi_4(\omega_2)} \\ A_{31}e^{-i\varphi_1(\omega_3)} & A_{32}e^{-i\varphi_2(\omega_3)} & A_{33}e^{-i\varphi_3(\omega_3)} & A_{43}e^{-i\varphi_4(\omega_3)} \\ A_{41}e^{-i\varphi_1(\omega_4)} & A_{42}e^{-i\varphi_2(\omega_4)} & A_{43}e^{-i\varphi_3(\omega_4)} & A_{44}e^{-i\varphi_4(\omega_4)} \end{bmatrix}. \quad (6)$$

The Doppler-compensatable signals formed by beamformer 810 are then compensated for their Doppler shift in respective Doppler-compensation modules 520-1, 520-2, 520-3, and 520-4, step 620. The operation and configuration of the Doppler-compensation modules is as described above for FIG. 5. The Doppler compensated signals are then passed to channel estimators 335-1, 335-2, 335-3 and 335-4 and receiver processing section 330, the operation of which is described above.

There is a tradeoff between the just described embodiment and the previously described embodiment that uses calculated directional signal. The former provides better performance in many environments, particularly when the antennas are inside a moving vehicle, such as car or commuter train, while the latter is less computationally expensive and easier to implement.

In another alternative embodiment of the invention, the Doppler-compensatable signals are received directional signals. As described above, the slowing down of the observed channel fluctuations is effectuated on the downlink by receiving signals that have a small range of Doppler shifts, and in some environments, particularly in environments that are not locally scattering, directional signals have a small range of Doppler shifts.

Figure 9:
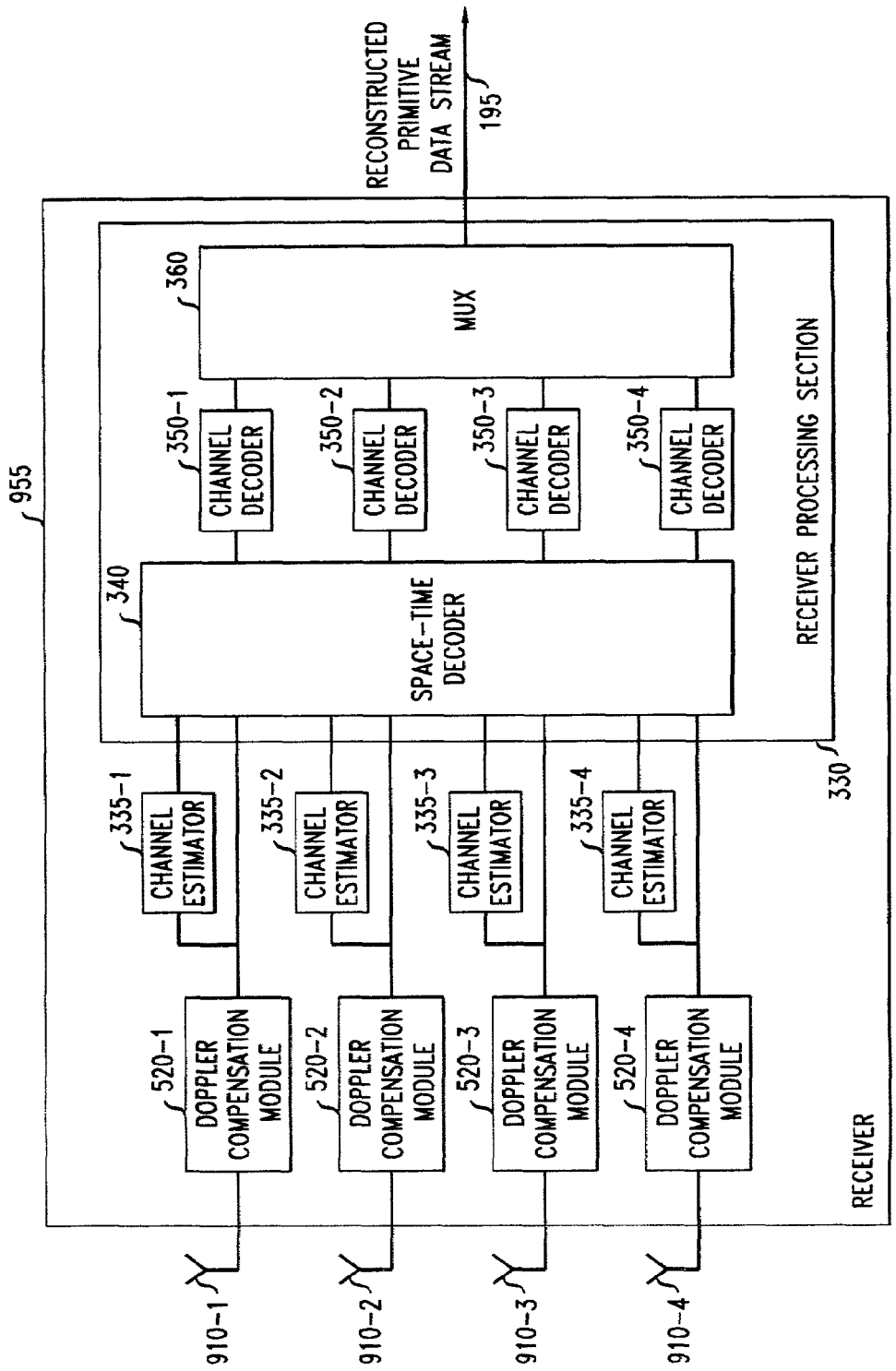
FIG. 9 illustrates, in accordance with an embodiment of the invention, a receiver coupled to directional receive antennas.
Figure 10:
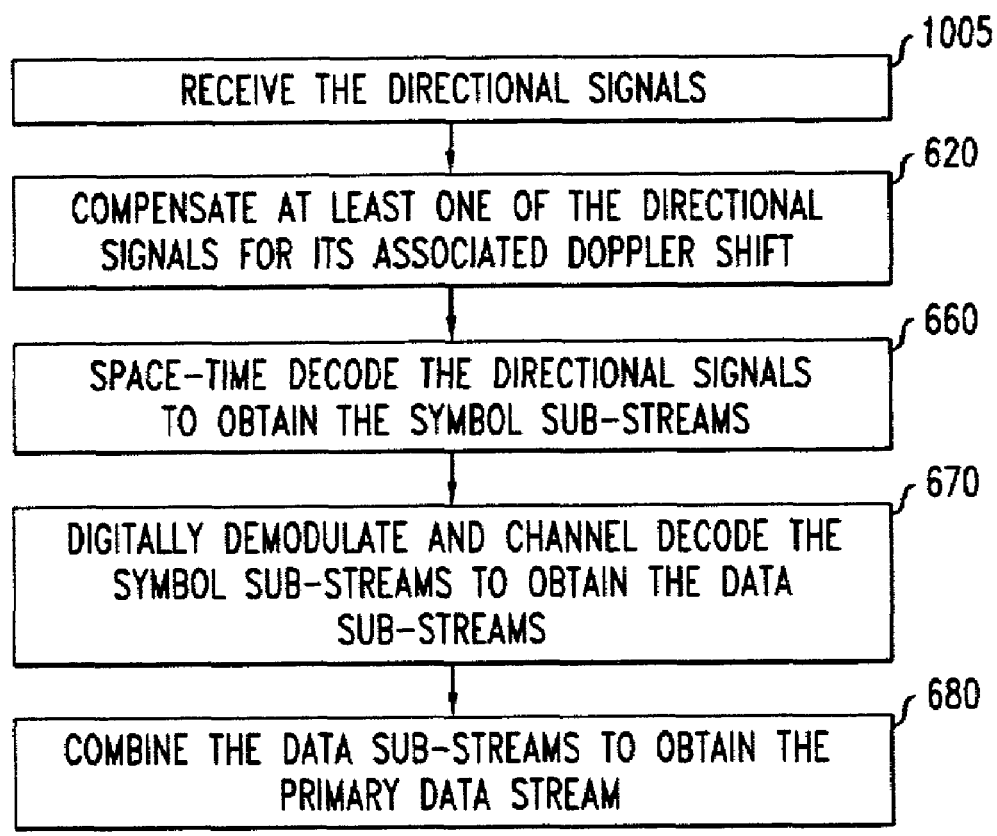
FIG. 10 is a flowchart illustrating a method of processing a received signal in accordance with the embodiment of the invention described with reference to FIG. 9.

FIG. 9, shows receiver 955 in accordance with another embodiment of the invention where the directional signals are not calculated but are actually received over receive directional antennas 910-1, 910-2, 910-3, and 910-4, step 1005, of FIG. 10. Each directional antenna covers an angle range. The aiming directions of the directional antennas can be selected using the same criteria used for selecting the directions of the calculated directional signals, as described above with reference to FIGS. 4A, 4B, and 5. Although receiver 955 is shown having four directional receive antennas, receiver 955 can have any number of directional antennas. The number of directional antennas is a tradeoff between 1) the desire to have enough antennas to cover most of the available angular range of 360° (or 180° if the antennas are half space-antennas) with narrow antennas, and 2) the cost of additional antennas. Similarly to the calculated directional signals, the width of the received directional signals is a tradeoff between 1) narrowing the angle range (i.e. reducing width), as this slows down the observed channel fluctuations, and 2) covering most of the available angular range. So if the cost is not a consideration then it is desired to cover most of the available angle range with a large number of narrow beam antennas.

The receive antennas supply the directional signal to respective Doppler-compensation modules 520-1, 520-2, 520-3, and 520-4 where the directional signals are compensated for their associated Doppler shift, step 1020. The operation and configuration of the Doppler-compensation modules is as described above for FIG. 5. The Doppler compensated signals are then passed to channel estimators 335-1, 335-2, 335-3 and 335-4 and receiver processing section 330, the operation of which is described above.

Observed channel fluctuations can also be slowed on the uplink as well as on the downlink. In an illustrative embodiment of the invention, signals are pre-compensated for Doppler shift prior to transmission such that when these Doppler-compensated signals are transmitted they produce transmitted signals in which the Doppler shift as observed at the receiver is reduced or even eliminated.

In the illustrative embodiments, the slowing down of the observed channel fluctuations can be effectuated on the uplink by pre-compensating a signal for a Doppler shift that is associated with the direction in which the signal is to be transmitted. The signals are then transmitted as directional signals, also referred to as directional beams (i.e., signals transmitted in a particular direction). Transmitting signals so that they form directional beams can be accomplished by, for example, transmitting the signals on directional antennas, or by processing the signals so that when they are transmitted on a plurality of antennas the transmitted signals combine constructively in a particular direction, or set of directions, and combine destructively in other directions. The latter can be accomplished using a phased-array antenna.

Figure 12:
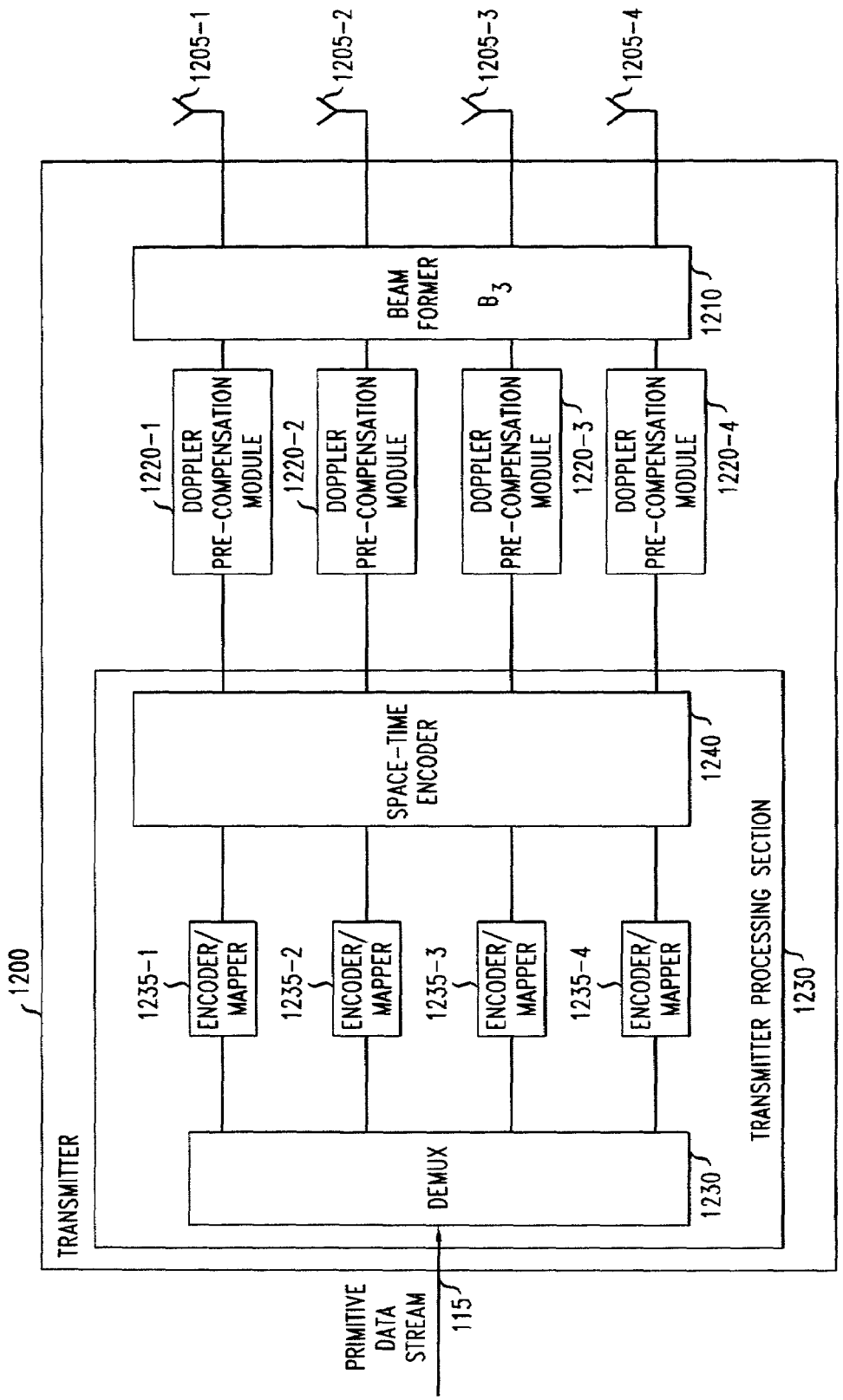
FIG. 12 illustrates a transmitter of the mobile terminal of FIG. 11A in accordance with an embodiment of the invention.
Figure 13:
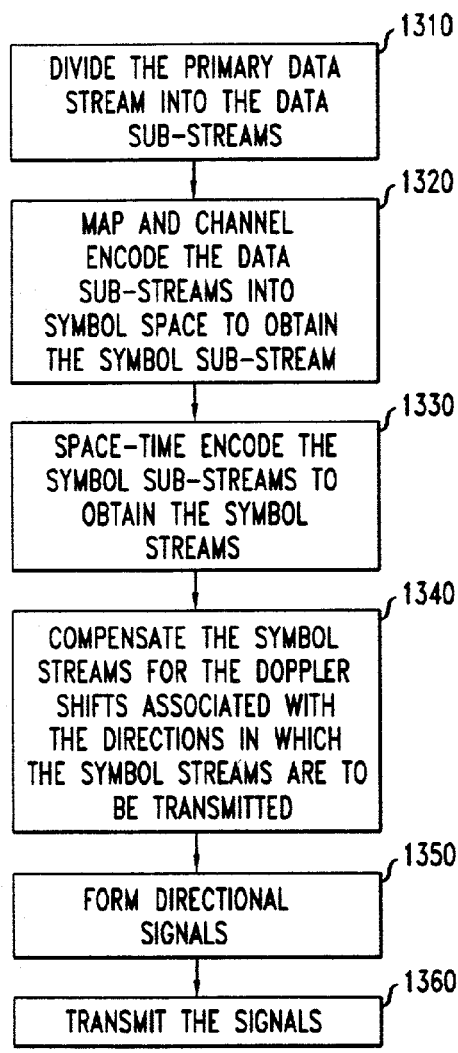
FIG. 13A is a flowchart illustrating a method of processing a signal that is to be transmitted in accordance with an embodiment of the invention described with reference to FIG. 12.
FIG. 13B is a flowchart illustrating a method of processing a signal that is to be transmitted in accordance with the embodiment of the invention described with reference to FIG. 14.
Figure 13:
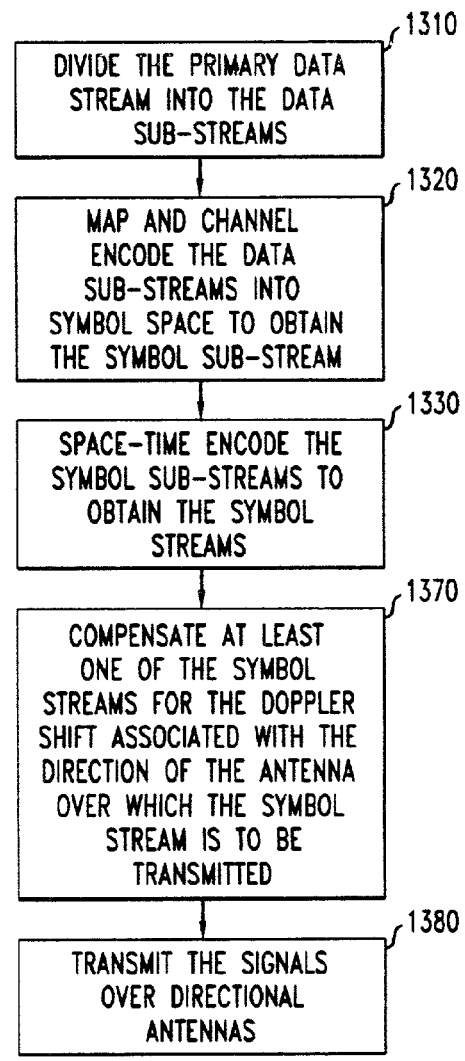

The reduction of the observed rate of change of the channel characteristics is now described with reference to FIGS. 12 and 13A for the uplink, for the case where the Doppler-compensated signals are processed to form directional signals. Transmitter 1200 includes a transmitter processing section. The transmitter processing section can be any appropriate transmitter processing section that processes a signal prior to Doppler pre-compensation. An illustrative transmitter processing section is shown in FIG. 12. Transmitter processing section 1230 divides primitive data stream 115 into a plurality of data sub-streams by demultiplexing primitive data stream 115 in demultiplexer 1230, step 1310 (of FIG. 13A). The sub-streams are channel coded and mapped to symbol constellations in respective encoder/mappers 1235-1, 1235-2, 1235-3, and 1235-4 to produce symbol sub-streams, step 1320. (Encoder/mappers 1235-1, 1235-2, 1235-3, and 1235-4 may employ appropriate any channel code, such as for example Turbo code.) The symbols are then space-time coded in space-time encoder 1240 to produce space-time encoded symbol sub-streams, step 1330. The space-time coding can be any appropriate kind of space-time coding, such as horizontal space-time coding, vertical space-time coding, or a layered space-time coding, such as for example the coding described in U.S. Pat. No. 6,097,771 cited above.

The space-time coded symbol streams are then compensated for Doppler shift in respective Doppler-pre-compensation modules 1200-1, 1200-2, 1200-3, and 1200-4, step 1340. The Doppler-pre-compensation modules determine the Doppler shift associated with a direction corresponding to a respective directional signal. The Doppler-pre-compensation modules then compensate the symbol streams for the Doppler shift corresponding to the direction into which the symbol stream will be transmitted. If the symbol stream is to be transmitted into several directions the symbol stream is divided or replicated and each such portion or replica is Doppler-pre-compensated for the direction into which it is to be transmitted.

Determining the Doppler shift associated with any particular direction signal can be accomplished in any appropriate manner. One way of determining the Doppler shift for a particular directional signal is by using the Doppler shift of similar downlink signals, where a similar downlink signal is one that has the same direction as the directional signal. The Doppler shift of signals on the downlink can be determined by the transmitter as described above, or simply obtained from the transmitter if the transmitter already determines the Doppler shift of the similar signal for other reasons, such as for example for use with one of the embodiments described above.

The Doppler shift of a similar signal on the downlink can then be used to determine the Doppler shift on the uplink. For example, if the center frequencies of the signals on the uplink and the downlink are the same the Doppler shift on the uplink is the same of the Doppler shift on the downlink. If the center frequencies on the two links are different then:

$$\text{Doppler shift on the uplink} = \frac{\text{Doppler shift on the downlink} * \text{center frequency of the uplink}}{\text{center frequency of the downlink}} \quad (7)$$

Doppler-pre-compensation modules 1200-1, 1200-2, 1200-3, and 1200-4, compensate the symbol streams using this determined Doppler shift such that when the symbol streams are transmitted, the Doppler shift as it appears to the receiver is reduced or even eliminated. Compensating the symbol streams (or portions or replicas thereof) for Doppler shift can operate as described above for Doppler compensation modules 520-1, 520-2, 520-3, and 520-4.

Although FIG. 12 shows a Doppler-pre-compensation module for each directional signal and each directional signal is compensated for its associated Doppler shift, alternatively any number from as few as one to as many as all of the directional signals can be Doppler compensated. The signals that are not Doppler compensated either pass through the Doppler-pre-compensation modules without being compensated, or by-pass the Doppler-pre-compensation modules entirely. Additionally, transmitter 1200 may only have Doppler-pre-compensation modules for the directional signals being compensated. Furthermore, although each Doppler-pre-compensation module is shown as a separate unit, the Doppler compensation for all of the directional signals being compensated may be performed, either in parallel or in series, in the same physical unit.

Figure 11A:
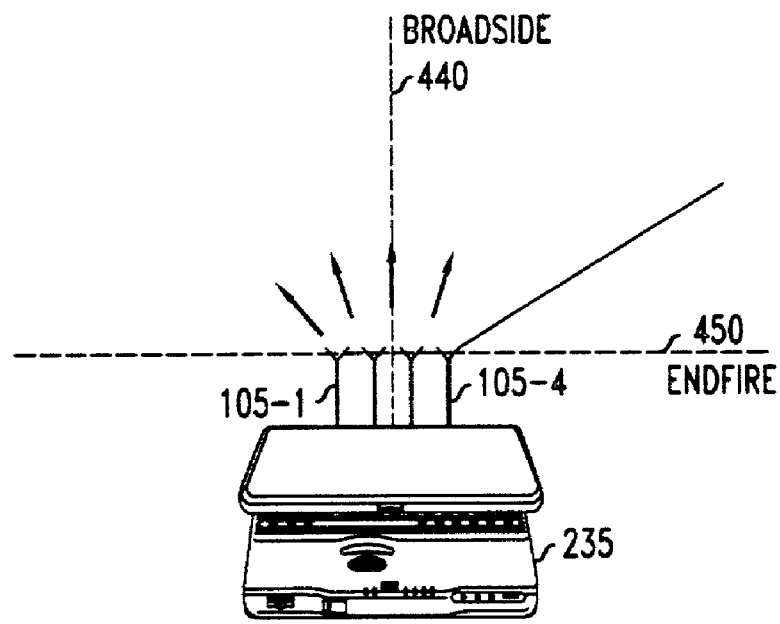
FIG. 11A illustrates the mobile terminal of FIG. 4A in accordance with another embodiment of the invention.
Figure 11B:
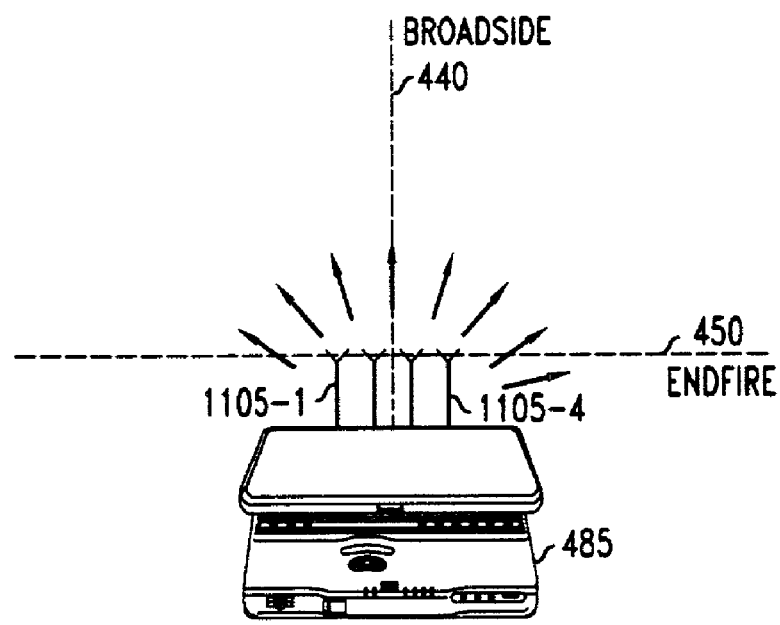
FIG. 11B illustrates the mobile terminal of FIG. 4B in accordance with another embodiment of the invention.

The Doppler-pre-compensated signal is then processed in beam-former 1210 to generate directional signals, step 1350. Beam-former 1210 can be configured to form any number of directional signals. Preferably, the number of directional signals formed is equal to the number of transmit antennas, as shown in FIG. 11A, or the number of directional signals formed is larger than the number of transmit antennas, as shown in FIG. 11B. Furthermore, symbols or information contained in one of the directional signals can be unique, or similar to, or identical to the symbols or information contained in one (or all) of the other directional signals.

The directions of these signals correspond to respective ranges of angles. Each directional signal transmitted from a mobile terminal is a composition of the signals that are transmitted in the angle range corresponding to the particular directional signal. That is, beam-former 1310 forms directional signals, each of which represents a signal transmitted by a directional antenna that covers the angle range corresponding to the particular directional signal.

The desired characteristics of the directions of the directional signals transmitted from transmitter 1200 are the same as the desired characteristics, described above, of the directional signals received or calculated at receivers 155 and 855.

Beam-former 1310 generates the directional signals, step 1360. The directional signals can be formed in any appropriate manner. In the illustrative embodiments the directional signals are formed as a function of the desired directions ($k_m$) of the signals and the locations of the antennas ($r_1$). Like beam-former 510, beam-former 1310 can be a processor or a multiplier, and beam-former 1310 operates similarly to beam-former 510, except beam-former 1310 uses matrix $B_3$, where $B_3$ is the transpose of matrix $B_1$.

$$B_3 = \frac{1}{\sqrt{R}} = \begin{bmatrix} e^{-ik_1*r_1} & e^{-ik_2*r_1} & \cdots & e^{-ik_{R-1}*r_1} & e^{-ik_R*r_1} \\ e^{-ik_1*r_2} & e^{-ik_2*r_2} & \cdots & e^{-ik_{R-1}*r_2} & e^{-ik_R*r_2} \\ \vdots & \vdots & \vdots & \vdots & \vdots \\ e^{-ik_1*r_R} & e^{-ik_2*r_R} & \cdots & e^{-ik_{R-1}*r_R} & e^{-ik_R*r_2} \\ \vdots & \vdots & \cdots & \vdots & \vdots \end{bmatrix} \quad (8)$$

The elements of matrix $B_3$ can be amplitude weighted. The weights can be based on the same factor as the weights in matrix $B_1$. The signals can be multiplied by the matrix $B_3$ with each signal multiplied by a row of the matrix, or the signals can be multiplied individually by their respective versions of a row of matrix $B_3$. A generalized version of a row of matrix $B_3$ is:

$$\frac{1}{\sqrt{R}} [e^{-ik_1*r_q} \; e^{-ik_2*r_q} \; \cdots \; e^{-ik_{R-1}*r_q} \; e^{-ik_R*r_q}], \quad (9)$$

where R is the number of transmit antennas elements, $k_m$ is the vector corresponding to the $m^{th}$ directional signal, and $r_q$ is the location of the $q^{th}$ antenna element with respect to a reference point, and where k and r are defined further above in the text describing the receiver.

Thus, for transmitter 1200, where signals are transmitted on one of the four antennas 1205-1, 1205-2, 1205-3, and 1205-4, respectively, matrix $B_3$ is:

$$B_3 = \frac{1}{\sqrt{4}} \begin{bmatrix} e^{-ik_1*r_1} & e^{-ik_2*r_1} & e^{-ik_3*r_1} & e^{-ik_4*r_1} \\ e^{-ik_1*r_2} & e^{-ik_2*r_2} & e^{-ik_3*r_2} & e^{-ik_4*r_2} \\ e^{-ik_1*r_3} & e^{-ik_2*r_3} & e^{-ik_3*r_3} & e^{-ik_4*r_3} \\ e^{-ik_1*r_4} & e^{-ik_2*r_4} & e^{-ik_3*r_4} & e^{-ik_4*r_4} \end{bmatrix}. \quad (10)$$

Although, the beam-forming module and the Doppler-pre-compensation modules are shown as two modules in FIG. 12, they can be the same module, for example both modules can be performed by the same software or hardware in either the same or different processors. Additionally, the beam-forming module and the Doppler-pre-compensation module can be in either the same or in different physical units, whether or not they are the same module.

Furthermore, although one embodiment of beam forming is described above any beam-forming method can be used. The beam forming can be any phase shifting of the signal streams so that when they add up in the air after being radiated they add up in phase in particular directions but not in others. For example, beam-former 1310 can use matrix $B_4$, where $B_4$ is the transpose of matrix $B_2$.

$$B_3 = \frac{1}{\sqrt{R}} \begin{bmatrix} e^{-i\varphi_1(\omega_1)} & e^{-i\varphi_1(\omega_2)} & \cdots & e^{-i\varphi_1(\omega_{R-1})} & e^{-i\varphi_1(\omega_R)} \\ e^{-i\varphi_2(\omega_1)} & e^{-i\varphi_2(\omega_2)} & \cdots & e^{-i\varphi_2(\omega_{R-1})} & e^{-i\varphi_2(\omega_R)} \\ \vdots & \vdots & \vdots & \vdots & \vdots \\ e^{-i\varphi_R(\omega_1)} & e^{-i\varphi_R(\omega_2)} & \cdots & e^{-i\varphi_R(\omega_{R-1})} & e^{-i\varphi_R(\omega_R)} \\ \vdots & \vdots & \cdots & \vdots & \vdots \end{bmatrix} \quad (11)$$

(Similarly, to matrix $B_2$, the elements of matrix $B_4$ can also be weighted.) A generalized version of a row of matrix $B_4$ is:

$$\frac{1}{\sqrt{R}} [e^{-i\varphi_m(\omega_1)} \, e^{-i\varphi_n(\omega_2)} \cdots e^{-i\varphi_m(\omega_{R-1})} e^{-i\varphi_m(\omega_R)}], \quad (12)$$

where R is the number of transmit antenna, $\phi_m(\omega_n)$ is the phase shift to the transmitted signal on the $m^{th}$ antenna for the $n^{th}$ Doppler shift, $\omega_n$ is the $n^{th}$ particular Doppler shift, and. The reference antenna can be any of the transmit antennas, such as, for example, transmit antenna 1205-1.

After the directional beams are formed they are transmitted over antennas 1205-1, 1205-2, 1205-3, and 1205-4.

Due to the compensation of the directional signals for their associated Doppler shift, when mobile terminal 235 moves, the phase of the multipaths of signals transmitted from terminal mobile 235 to base station 230, as observed at the receiver, i.e. base station 230, no longer appears to change as rapidly (or at all). This produces a reduction in the observed rate of change of the channel characteristics at the receiver.

Figure 14:
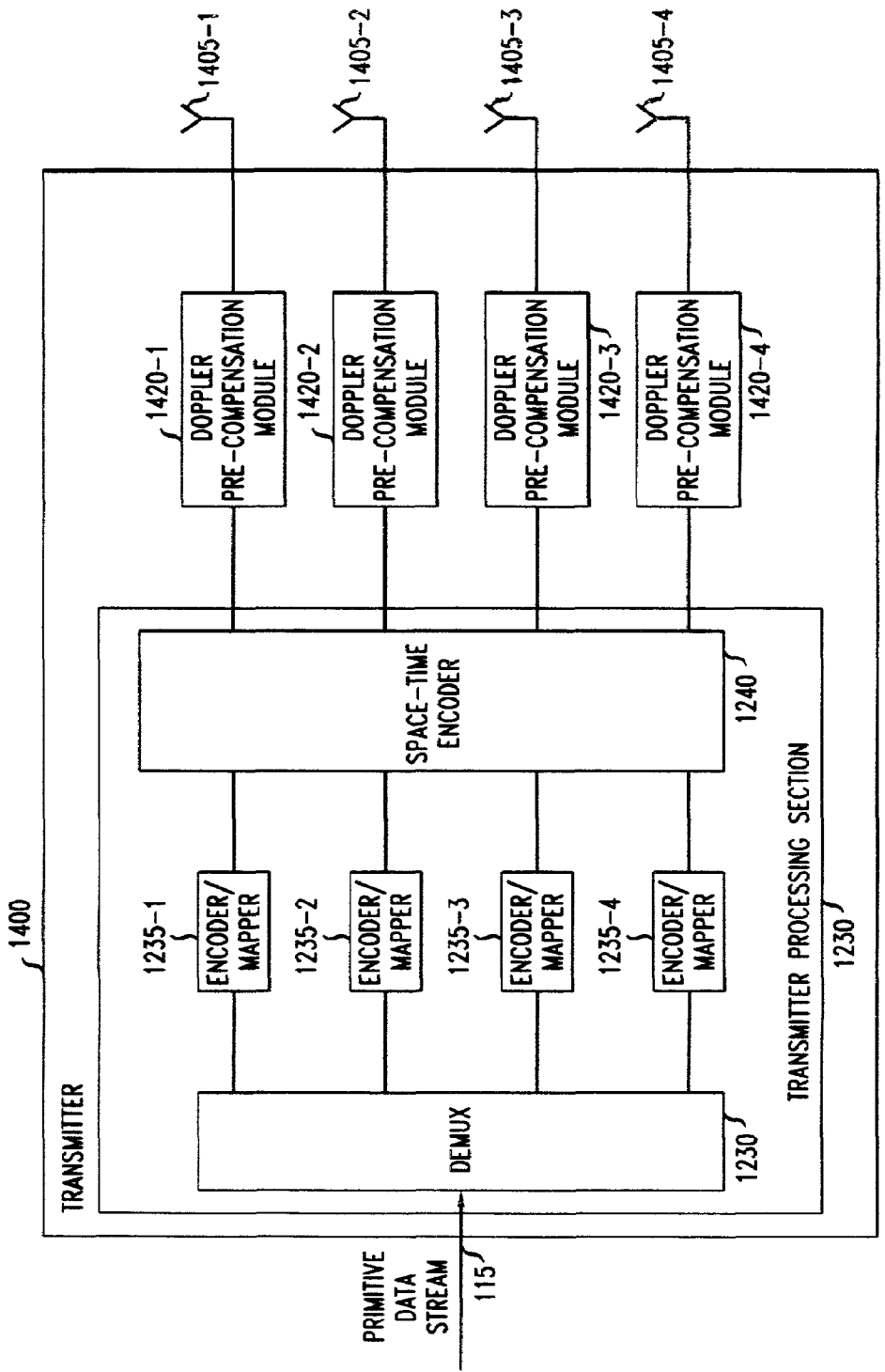
FIG. 14 illustrates, in accordance with an embodiment of the invention, a transmitter coupled to directional transmit antennas.

In another alternative embodiment of the invention, the Doppler-pre-compensated signals are transmitted over directional antennas. FIG. 14, shows transmitter 1400 in accordance with this embodiment of the invention. Primitive data stream 115 is processed in transmitter processing section 1230, the operation of which is described above, to produce the symbol streams, which are Doppler pre compensated in Doppler-pre-compensation modules 1420-1, 1420-2, 1420-3, and 1420-4 to compensate the symbol streams with the Doppler shift associated with the directions of the respective directional transmit antennas 1405-1, 1405-2, 1405-3, or 1405-4 over which it will be transmitted, step 1370 of FIG. 13B. The Doppler shift associated with the direction is determined as described above with reference to Doppler-pre-compensation modules 1200-1, 1200-2, 1200-3, and 1200-4. Doppler-pre-compensation modules 1420-1, 1420-2, 1420-3, and 1420-4 then compensate the symbol streams for this Doppler shift. The compensation can operate as described above for Doppler compensation modules 520-1, 520-2, 520-3, and 520-4.

Similarly to transmitter 1200, transmitter 1400 shows a Doppler-pre-compensation module for each directional signal and each directional signal is compensated for its associated Doppler shift, alternatively any number from as few as one to as many as all of the directional signals can be Doppler compensated. And, similarly to transmitter 1200, transmitter 1400 does not have to have a Doppler-pre-compensation module for each direction in which the signals will be transmitted.

The Doppler pre-compensated signals are then transmitted over directional antennas 1405-1, 1405-2, 1405-3, and 1405-4, step 1380. Transmitter 1400 can have any number of directional antennas. As described above with reference to FIG. 9, the number of directional antennas is a tradeoff between 1) the desire to have enough antennas to cover most of the available angular range (i.e. 360° for omni directional antenna, 180° for half-space antennas) with narrow antennas, and 2) the cost of additional antennas. Each directional antenna covers an angle range. The directions of directional antennas can be selected using the same criteria that are used for selecting the directions of the directional signals as described above with reference to FIGS. 4A, 4B, and 9.

The foregoing is merely illustrative and various alternatives will now be discussed. For example, in the illustrative embodiment the system is described as a multi-input, multi-output system having four transmit antennas and four receive antennas. In alternative embodiment, the system can be just a multi-input system or a multi-output system. Particularly, the embodiments of the invention used to slow down the observed channel fluctuation on the downlink can be used in a multi-out system (i.e. having multiple antennas at the receiver) regardless of whether there is one or many antennas at the transmitter. However, these embodiments of slowing down the a observed channel fluctuation on the downlink are particularly advantageous in a system that has multiple antennas at the transmitter. Furthermore, in alternative embodiments of the invention, the system can have any number of transmit and/or receive antennas, and the number of transmit antennas may be different from the number of receive antennas.

The method for slowing down the observed channel fluctuations can be performed for the downlink alone, for the uplink alone, or for both the downlink and the uplink. Furthermore, the transmitter and receiver of the same device, such as a mobile terminal, can use different embodiments of the present invention concurrently. For example, the transmitter can transmit Doppler-pre-compensated signals over directional antennas, and the receiver can calculate Doppler-compensatable signals, where these Doppler-compensatable signals can be either directional signals or signals calculated using the portions of the received signals that have the same Doppler shift.

The transmitter and receiver embodying the principles of the present invention can be used in any mobile parts of a wireless communication system in addition, or instead of, the ones shown in the illustrative embodiments. For example, the transmitter and/or receiver can be part of a mobile base station, a mobile terminal, a mobile wireless hub of a wireless local area network, a wireless terminal of a local area network. Furthermore, the mobile terminal can be any type of mobile terminal, such as, for example, a wireless telephone, a laptop, or a personal digital assistant.

In the illustrative embodiment the channel characteristics are determined from the training sequences. In alternative embodiments, the present invention can be used when the channel characteristics are otherwise determined. For example, the present invention can be used with techniques where the channel characteristics are determined using so-called blind techniques or semi-blind techniques, where channel characteristics are determined from spectral properties known about the data.

The block diagrams presented in the illustrative embodiments represent conceptual views of illustrative circuitry embodying the principles of the invention. Any of the functionality of the illustrative circuitry can be implemented as either a single circuit or as multi circuits. The functionality of multiple illustrative circuitry can also be implemented as a single circuit. Additionally, one or more of the functionalities of the circuitry represented by the block diagrams may be implemented in software by one skilled in the art with access to the above descriptions of such functionality.

In the illustrative embodiment, the antennas are positioned on the back of a laptop, as shown in FIGS. 4A, 4B, 11A and 11B, and therefore typically can only transmit signals and receive signals from an angular range of up to 180° because the laptop cover blocks 180°. Thus, it is possible to avoid ambiguity lobes. In alternative embodiments, ambiguity lobes can develop. For example, in the case where omni-directional antennas are used in a linear array, each formed directional signal will consist of two directional signals: one in front of the array, the other in the back of the array, a so-called ambiguity lobe. The front and back lobes will experience Doppler shifts that are different, e.g. one may have a positive Doppler shift, the other a negative Doppler shift. The combination of these two Doppler components will result in an effective channel, which is in general time-varying and frequency dependent. In this case Doppler compensation of the incoming signal is still possible by applying a time-varying Wiener filter $W_j(\omega,t)$ to the $j^{th}$ formed directional signal:

$$W_j(\omega, t) = \frac{K_j^*(\omega, t)}{|K_j(\omega, t)|^2 + \sigma^2(\omega, t)} \quad (13)$$

where $K_j(\omega,t)$ is the effective channel seen by the $j^{th}$ formed directional receiver and $\sigma^2(\omega,t)$ is the spectral density of the noise, allowed to be dependent on time t and frequency $\omega$ for generality. The Doppler-compensation module would now require estimation of $K_j(\omega,t)$.

In the illustrative embodiment the wireless communication system is a CDMA system. In alternative embodiments the wireless communication system can use other air interface techniques, such as for example, Universal Mobile Telecommunication System (UMTS), Time Division Multiple Access (TDMA), Global System for Mobile (GSM), and Orthogonal Frequency Division Multiplexing (OFDM).

Furthermore, although in the illustrative embodiments, elements are shown as being directly connected to each other, the elements are coupled to each other and additional elements may be coupled between the illustrated elements. As used herein, elements being coupled to each other means that other elements may be interposed between them.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, while the invention has been described with reference to a preferred embodiment, it will be understood by those skilled in the art having reference to the specification and drawings that various modifications and alternatives are possible therein without departing from the spirit and scope of the invention.

We claim:

1. A method for use in a wireless communication device having at least two receive antennas, the method comprising the steps of:
   receiving a first received signal on a first receive antenna;
   receiving a second received signal on a second receive antenna; and
   separately processing each one of the received signals to compensate each signal for its Doppler effects.

2. The invention of claim 1, wherein:
   the receive antennas are directional antennas such that the received signals are directional signals; and
   the processing step comprises compensating each of the directional signals for its Doppler effects.

3. The invention of claim 2, wherein:
   each of the directional antennas covers a range of angles; and
   the range of angles of any one of the directional receive antennas does not completely overlap with the range of angles of any of the other of the directional antennas.

4. The invention of claim 1, wherein the processing step comprises the steps of:
   calculating at least two directional signals using the received signals; and
   compensating each of the calculated directional signals for its Doppler effects.

5. The invention of claim 4, wherein the calculating step comprises calculating at least as many directional signals as there are receive antennas.

6. The invention of claim 4, wherein each calculated directional signal corresponds to a respective angle range and is a composition of the signals that arrive from the corresponding angle range.

7. The invention of claim 1, wherein:
   each received signal comprises at least two transmit signals representing information of a data stream; and
   each of the at least two transmit signals were concurrently transmitted over respective different transmit antennas of a second wireless communication device.

8. A wireless communication device comprising:
   a first receive antenna adapted to receive a first received signal;
   a second receive antenna adapted to receive a second received signal; and
   a compensation module coupled to the receive antennas, the compensation module adapted to process each of the received signals to compensate each signal for its Doppler effects.

9. The invention of claim 8, wherein:
   the receive antennas are directional antennas such that the received signals are directional signals; and
   the compensation module comprises a Doppler-compensation module adapted to compensate each of the directional signals for its Doppler effects.

10. The invention of claim 9, wherein:
    each of the directional antennas covers a range of angles; and
    the range of angles of any one of the directional receive antennas does not completely overlap with the range of angles of any of the other of the directional antennas.

11. The invention of claim 8, wherein the compensation module comprises:
a beam-forming module adapted to receive the received signals, the beam-forming module being adapted to calculate at least two directional signals using the received signals; and
a Doppler-compensation module adapted to receive the calculated directional signals, the Doppler-compensation module adapted to compensate each of the calculated directional signals for its Doppler effects.

12. The invention of claim 11, wherein the beam-forming module is further adapted to calculate at least as many formed directional signals are there are the receive antennas.

13. The invention of claim 11, wherein each calculated directional signal corresponds to a respective angle range and is a composition of the signals that arrive from the corresponding angle range.

14. The invention of claim 8, wherein:
each received signal comprises at least two transmit signals representing information of a data stream; and
each of the at least two transmit signals were concurrently transmitted over respective different transmit antennas of a second wireless communication device.

15. A method for use in a wireless communication device, the method comprising the steps of:
separately processing signals to pre-compensate for Doppler effects associated with each signal; and
transmitting the signals over a transmit antenna to produce one or more directional signals.

16. The invention of claim 15, wherein the transmit antenna is a directional transmit antenna.

17. The invention of claim 15, wherein the transmit antenna is a phased-array antenna.

18. The invention of claim 15, wherein the number of directional signals is at least equal to the number of transmit antennas.

19. A wireless communication device for transmitting a directional signal, the wireless communication device comprising:
a Doppler-pre-compensation module adapted to separately process input signals to pre-compensate each input signal for Doppler effects; and
a transmit antenna adapted for transmitting the directional signal, the directional signal being a function of the Doppler compensated input signals.

20. The invention of claim 19, wherein the transmit antenna is a directional transmit antenna.

21. The invention of claim 19, wherein the transmit antenna is a phased-array antenna.

22. The invention of claim 19, wherein the number of directional signals is at least equal to the number of transmit antennas.

23. A method for use in a wireless communication device having at least two receive antennas, the method comprising the steps of:
receiving a first received signal on a first receive antenna;
receiving a second received signal on a second receive antenna; and separately processing each one of the received signals to compensate each signal for its Doppler effects, the processing step further comprising the steps of:
calculating at least two signals using the received signals, each of the calculated signals having a Doppler shift range, the Doppler shift range being a proper subset of a combined Doppler shift range of the received signals; and
compensating at least one of the calculated signals for its respective Doppler effect.

24. The invention of claim 23, wherein the calculating step comprises calculating at least as many directional signals as there are receive antennas.

25. The invention of claim 23, wherein the calculating step comprises the step of multiplying the received signals by $$\frac{1}{\sqrt{R}}[A_{n1}e^{-i\varphi_1(\omega_n)} \ A_{n2}e^{-i\varphi_2(\omega_n)} \ \ldots \ A_{n(R-1)}e^{-i\varphi_{R-1}(\omega_n)} \ A_{nR}e^{-i\varphi_R(\omega_n)}];$$

where:
R is the number of the receive antennas;
$\phi_m(\omega_n)$ is the phase shift of the received signal on the $m^{th}$ antenna for an $n^{th}$ Doppler shift,
$\omega_n$ is the $n^{th}$ Doppler shift, and
$A_{nm}$ is the amplitude weight applied to the received signal received over the $m^{th}$ antenna with the $n^{th}$ Doppler shift.

26. A wireless communication device comprising:
a first receive antenna adapted to receive a first received signal;
a second receive antenna adapted to receive a second received signal; and
a compensation module coupled to the receive antennas, the compensation module adapted to process each of the received signals to compensate each signal for its Doppler effects, the compensation module comprising:
a beam-forming module adapted to receive the received signals, the beam-forming module being adapted to calculate at least two signals using the received signals, each of the calculated signals corresponds to a Doppler shift range that is a proper subset of a combined Doppler shift range of the received signals; and
a Doppler-compensation module adapted to compensate at least one of the calculated signals for its respective Doppler effect.

27. The invention of claim 26, wherein the beam-forming module is further adapted to calculate at least as many formed directional signals are there are receive antennas.

28. The invention of claim 26, wherein the beam-forming module comprises a multiplier having an input coupled to outputs of the receive antennas and having an output coupled to an input of the Doppler compensation module, the multiplier adapted to multiply a particular one of the received signals by $$\frac{1}{\sqrt{R}}[A_{n1}e^{-i\varphi_1(\omega_n)} \ A_{n2}e^{-i\varphi_2(\omega_n)} \ \ldots \ A_{n(R-1)}e^{-i\varphi_{R-1}(\omega_n)} \ A_{nR}e^{-i\varphi_R(\omega_n)}];$$

where:
R is the number of the receive antennas;
$\phi_m(\omega_n)$ is the phase shift of the received signal on the $m^{th}$ antenna for an $n^{th}$ Doppler shift,
$\omega_n$ is the $n^{th}$ Doppler shift, and
$A_{nm}$ is the amplitude weight applied to the received signal received over the $m^{th}$ antenna with the $n^{th}$ Doppler shift.

* * * * *